United States Patent
Sayama

(10) Patent No.: US 8,465,096 B2
(45) Date of Patent: Jun. 18, 2013

(54) STOWABLE VEHICLE SEAT

(75) Inventor: Tatsuo Sayama, Tochigi (JP)

(73) Assignee: TS Tech Co., Ltd., Asaka-Shi (JP)

( * ) Notice: Subject to any disclaimer, the term of this patent is extended or adjusted under 35 U.S.C. 154(b) by 352 days.

(21) Appl. No.: 12/922,899

(22) PCT Filed: Mar. 26, 2009

(86) PCT No.: PCT/JP2009/056127
§ 371 (c)(1),
(2), (4) Date: Sep. 16, 2010

(87) PCT Pub. No.: WO2009/119741
PCT Pub. Date: Oct. 1, 2009

(65) Prior Publication Data
US 2011/0012416 A1 Jan. 20, 2011

(30) Foreign Application Priority Data

Mar. 26, 2008 (JP) .................................. 2008-081632
Mar. 26, 2008 (JP) .................................. 2008-081633

(51) Int. Cl.
B60N 2/02 (2006.01)
(52) U.S. Cl.
USPC ................ 297/378.14; 297/378.1; 296/65.05; 296/65.09
(58) Field of Classification Search
USPC ............. 297/378.1, 378.14; 296/65.05, 65.09
See application file for complete search history.

(56) References Cited

U.S. PATENT DOCUMENTS

| 6,231,101 | B1 * | 5/2001 | Kamida et al. ................. 296/63 |
| 6,644,730 | B2 * | 11/2003 | Sugiura et al. ................. 297/15 |
| 2004/0046408 | A1 * | 3/2004 | Satoh et al. ................. 296/65.09 |
| 2006/0066144 | A1 * | 3/2006 | Tsujibayashi et al. ... 297/378.14 |

FOREIGN PATENT DOCUMENTS

| JP | 58-93531 U | 6/1983 |
| JP | 09-086244 A | 3/1997 |
| JP | 2001-347864 A | 12/2001 |
| JP | 2005-053240 A | 3/2005 |
| JP | 2006-082698 A | 3/2006 |
| JP | 2007-069754 A | 3/2007 |

* cited by examiner

Primary Examiner — Sarah B McPartlin
(74) Attorney, Agent, or Firm — Drinker Biddle & Reath LLP

(57) ABSTRACT

A stowable vehicle seat includes a seat supporting portion that supports one end portion side of a seat cushion movably in a front-and-rear direction, a seat back that can be folded to a seat cushion through a reclining mechanism, a link mechanism that is connected to the reclining mechanism and is movable, and a strap connected to the reclining mechanism through the link mechanism. The link mechanism has a fourth link member that prohibits return from a moved position to an initial position after movement by the strap, and since an unlocked state of the reclining mechanism is maintained even if a pulling operation of the strap is stopped, the seat back can be reliably folded and stowed.

14 Claims, 20 Drawing Sheets

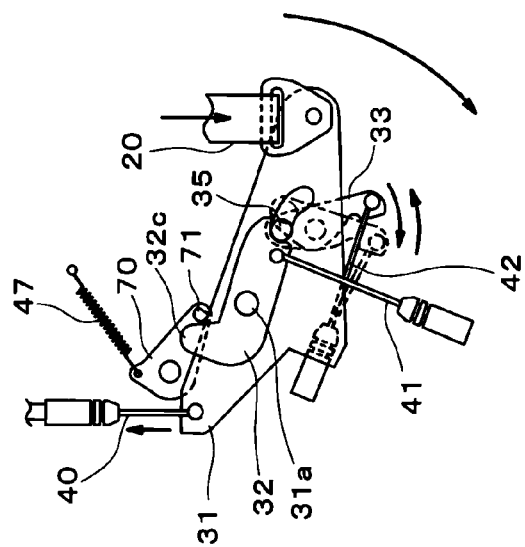
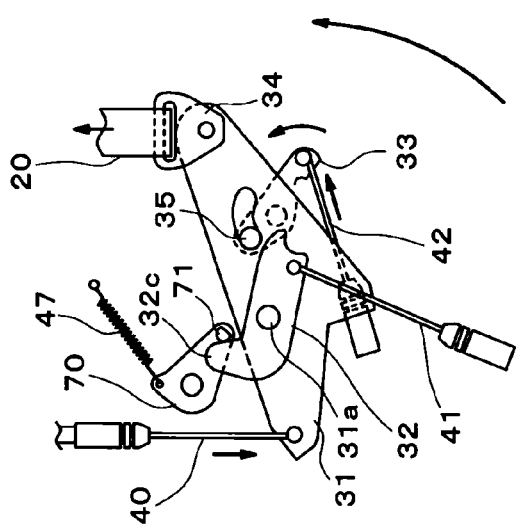
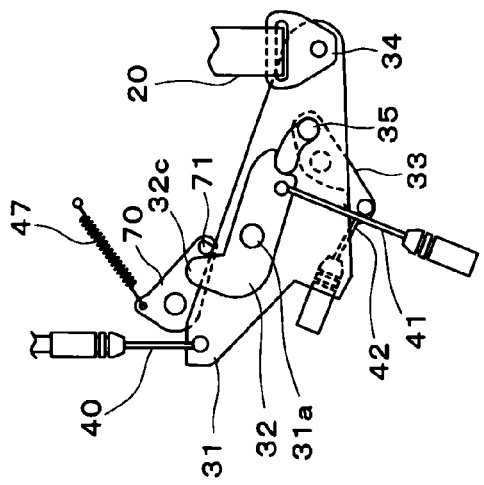

STOWABLE VEHICLE SEAT

CROSS REFERENCE TO RELATED APPLICATIONS

This application is the U.S. national phase of the International Patent Application No. PCT/JP2009/056127 filed Mar. 26, 2009, which claims the benefit of Japanese Patent Application Nos. 2008-081632 filed Mar. 26, 2008, and 2008-081633 filed Mar. 26, 2008, the entire contents of which are incorporated herein by reference.

BACKGROUND

The present invention relates to a stowable vehicle seat and particularly to a stowable vehicle seat that has improved operability.

A stowable vehicle seat has been known, as is a technique in which a front-side leg portion that is lockable to and unlockable from a vehicle body floor side is disposed on the front side of a seat cushion forming the vehicle seat and a support portion rotatable in the front-and-rear direction on a front side of a containing recess portion (stowage recess portion) formed in the vehicle body floor is disposed on the rear end portion side thereof, lock of the front-side leg portion is unlocked, and the vehicle seat is rotated rearward and contained in the containing recess portion in a state in which a seat back is folded onto the seat cushion, for example.

That is, the prior-art stowable vehicle seat is, as shown in Japanese Unexamined Patent Application Publication No. 2006-082698 ("the '698 Publication"), configured such that lock of the front-side leg portion to the vehicle body floor side is unlocked by a lever operation and the seat back is folded by a pulling operation of a strap, while the seat cushion is rotated rearward at the same time around rotating shafts disposed on the right and left sides of the rear end portion of the seat cushion so that the vehicle seat is containable in the containing recess portion.

The technique described in the '698 Publication is configured such that lock of a reclining mechanism is unlocked and the seat back is folded onto the seat cushion by the pulling operation of the strap, and the vehicle seat is rotated in the stowing rotating direction to perform a stowing operation.

However, since the above technique is configured such that the reclining mechanism is unlocked in conjunction with the pulling operation of the strap, if the pulling operation of the strap is stopped during the rotation, the reclining mechanism is locked again even if the seat back is in the open state. That is, a problem might occur in that the seat back cannot be stowed due to the difference in the operation methods.

SUMMARY

In view of the above problems, an object of various embodiments of the present invention is to provide a stowable vehicle seat having improved operability by making reliable stowage possible even if the operating method is different in the stowing operation of the stowable vehicle seat.

Another object is to provide a stowable vehicle seat having improved operability while a cost and a weight are reduced.

The above problems are solved by providing seat support that supports one end portion side of a seat cushion movably in a front-and-rear direction, a seat back that is foldable onto the seat cushion, a reclining mechanism that folds the seat back onto the seat cushion, a link mechanism connected to the reclining mechanism and being movable, and operating element connected to the reclining mechanism through the link mechanism, in which the link mechanism has a prohibiting member that prohibits return of the link mechanism from the moved position to the initial position after being moved by the operating element.

As mentioned above, since the prohibiting member is provided that prohibits return of the link mechanism from the moved position to the initial position after being moved by the operating element, even if a pulling speed or a pulling load of the operating element is changed during a seat stowing operation or if the pulling operation is stopped, the link mechanism is prohibited by the prohibiting member from returning to the initial position but can be maintained at the moved position. Therefore, the seat back can be folded while an unlocked state of the reclining mechanism is maintained. As mentioned above, regardless of the difference in the operation methods of the operating element, the stowable vehicle seat can be reliably stowed.

Also, the stowing and rotating operation of the seat and an unlocking operation of the lock state of the reclining mechanism can be performed by one operation of the operating element, and favorable operability can be ensured during the seat stowing operation.

The above problem is also solved by providing first seat support that supports one end portion side of a seat cushion movably in the front-and-rear direction, a seat back that is foldable onto the seat cushion, a reclining mechanism that folds the seat back onto the seat cushion, second seat support disposed on the other end portion side of the seat cushion, locking and unlocking elements that can lock and unlock the second seat support to the vehicle body floor side, a link mechanism connected to the reclining mechanism and the locking and unlocking elements and being movable, and operating element connected to the reclining mechanism and the locking and unlocking elements through the link mechanism, in which the link mechanism has a prohibiting member that prohibits return of the link mechanism from the moved position to the initial position after being moved by the operating element.

With the above configuration, even if a pulling speed or a pulling load of the operating element is changed or if the pulling operation is stopped during a seat stowing operation, the link mechanism is prohibited from returning to the initial position but the seat back can be folded while the unlocked state of the reclining mechanism is maintained. Therefore, regardless of the difference in the operation methods of the operating element, the stowable vehicle seat can be reliably stowed.

Also, the stowing and rotating operation of the seat and an unlocking operation of the lock state of the reclining mechanism and the locking and unlocking elements of the leg portion can be performed by one operation of the operating element, and favorable operability can be ensured during the seat stowing operation.

Specifically, it is preferable that the link mechanism has a first link member connected to the operating element and the reclining mechanism, and the prohibiting member has a locking portion that locks and unlocks the first link member in which if the first link member is moved by the operating element to a predetermined position, it is locked by the locking portion of the prohibiting member so that movement in the direction to return the link mechanism to the initial position is prohibited.

With the above configuration, after the first link member is moved to the predetermined position, it is locked to the locking portion of the prohibiting member, and the movement of the link mechanism is reliably prohibited.

Also, it is preferable that the stowable vehicle seat further has a detection mechanism that is connected to the link mechanism and detects a state in which the seat back is folded, the link mechanism has at least one detection link member that detects the state in which the seat back is folded by the detection mechanism and is moved, in which if the detection link member is moved by the detection mechanism, lock between the locking portion of the prohibiting member and the first link member is unlocked.

With the above configuration, if the seat back is folded onto the seat cushion, the detection link is moved by the detection mechanism, the lock between the prohibiting member and the first link member is unlocked, and the link mechanism is moved to the direction to return to the initial position so that the reclining mechanism is lockable. Therefore, the seat is not opened and rattled in the seat stowed state.

Also, the prohibiting member is preferably urged to a direction to be brought into contact with the first link member all the time.

With the above configuration, since the prohibiting member is moved with the movement of the first link member, when the first link member has reached the predetermined position by the operation of the operating element, the prohibiting member is movable to a position where the first link member is lockable.

Moreover, it is preferable that the link mechanism has a second link member connected to the locking and unlocking elements and the second link member is provided with a contact portion that can be brought into contact with the locking portion of the prohibiting member.

With the above configuration, during a returning operation, if the second link member is moved and is brought into contact with the locking portion of the prohibiting member at the contact portion pushes the locking portion of the prohibiting member in a direction opposite to the direction where the prohibiting member is locked with the first link member, the prohibiting member does not prohibit the movement of the first link member, and by stopping the pulling operation of the operating element, the first link member is moved to the direction of the initial position and can lock the reclining mechanism.

Moreover, it is preferable that the link mechanism includes the second link member connected to the locking and unlocking elements and a third link member that has a locking portion that locks the second link member and locks and unlocks the second link member to the first link member, and the detection link member is constituted by the same member as the third link member.

With the above configuration, if the seat back is folded onto the seat cushion, the third link member, which is the detection link member, is moved, the lock between the locking portion of the third link member and the second link member is unlocked, and the lock state of the second link member locked to the first link member is unlockable. Therefore, the link mechanism is moved in the direction to return to the initial position and can lock the reclining mechanism.

Also, in the returning operation, since the second link member has been unlocked, lock of the locking and unlocking elements of the front-side leg portion is not unlocked and the seat back is raiseable with respect to the seat cushion. Thus, favorable operability during the stowing and returning operations of the seat can be ensured.

It is preferable that the second link member is supported coaxially with the first link member and the third link member is supported by the first link member.

The above configuration reduces the number of components, cost and weight.

The detection link member can be constituted by the same member as the prohibiting member. With this configuration, when the seat back is folded, the prohibiting member, which is the detection link member, is moved by the detection mechanism in the direction to directly unlock the lock so that the link mechanism is movable to the direction to return to the initial position, thus reducing the number of components, cost, and weight.

Even if the pulling speed or the pulling load of the operating element is changed or if the pulling operation is stopped during the seat stowing operation, the seat back is foldable while the unlocked state of the reclining mechanism is maintained. Therefore, regardless of the difference in the operation methods of the operating element, the stowable vehicle seat is reliably stowable.

In an embodiment, the movement of the link mechanism is reliably prohibited.

In an embodiment, the seat open and rattling in the seat stowed state can be suppressed.

In an embodiment, when the link mechanism is moved by the operation of the operating element to the predetermined position, the prohibiting member is moved, and the unlocked state of the reclining mechanism is reliably maintainable.

In an embodiment, during the returning operation, the reclining mechanism is reliably lockable by stopping the pulling operation of the operating element.

In an embodiment, favorable operability is ensured both in the seat stowing and returning operations.

Various embodiments reduce the number of components, cost, and weight.

BRIEF DESCRIPTION OF DRAWINGS

The drawing figures illustrate various embodiments of the invention, that are described in more detail below.

FIGS. 11A-C are operation explanatory diagrams of the link mechanism in the returning operation of the stowable vehicle seat according to the first embodiment of the present invention.

DETAILED DESCRIPTION

First Embodiment

The first embodiment of the present invention will be described below referring to the attached drawings. Members, arrangement and the like described below do not limit the present invention but it is natural that various variations are possible according to the gist of the present invention.

Also, in this description, initial positions of a link mechanism and each link member refer to positions in a state before the link mechanism is operated by the operating element and moved, while a moved position refers to a position in a state in which the link mechanism has been operated by the operating element and moved (including the state during moving).

FIGS. 1 to 11 show a first embodiment of the present invention. First, a configuration of a seat S according to this embodiment will be described based on FIGS. 1 to 4.

A vehicle equipped with the seat S according to this embodiment includes three-row seats arranged in series in a longitudinal direction, and seats on the third row are stowable. On the rear of the seat S, a stowage recess portion 5 that stows the seat S is disposed on a vehicle body floor 4. A floor carpet, not shown, is laid substantially over the entire surface of the vehicle body floor 4.

The seat S has three seats crosswise and is constituted by a right-side seat S1 for two people located on the right side with respect to a traveling direction of the vehicle and a left-side seat S2 for one person.

In the following explanation, the description of right and left side indicating the direction refers to a direction with respect to the traveling direction of the vehicle.

Also, since a containing mechanism and an operating method are the same for both the right-side seat S1 and the left-side seat S2, the right-side seat S1 will be referred to as the seat S collectively in the following explanation example for convenience.

Figure 1:
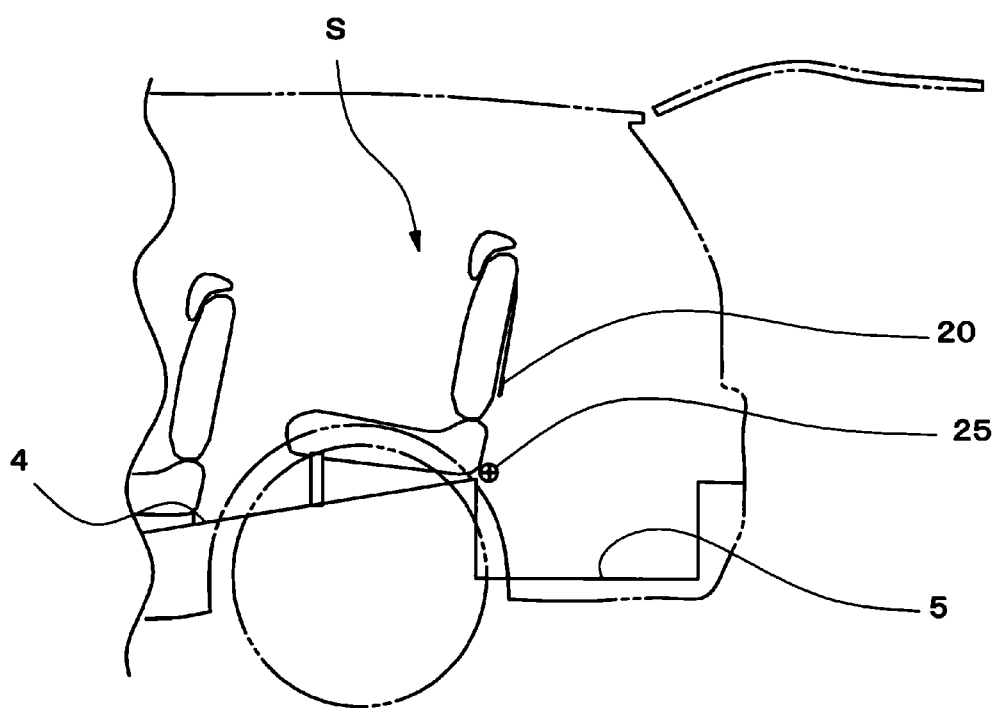
FIG. 1 is a side view schematic diagram of a rear portion of a vehicle equipped with a stowable vehicle seat according to a first embodiment of the present invention.
Figure 2:
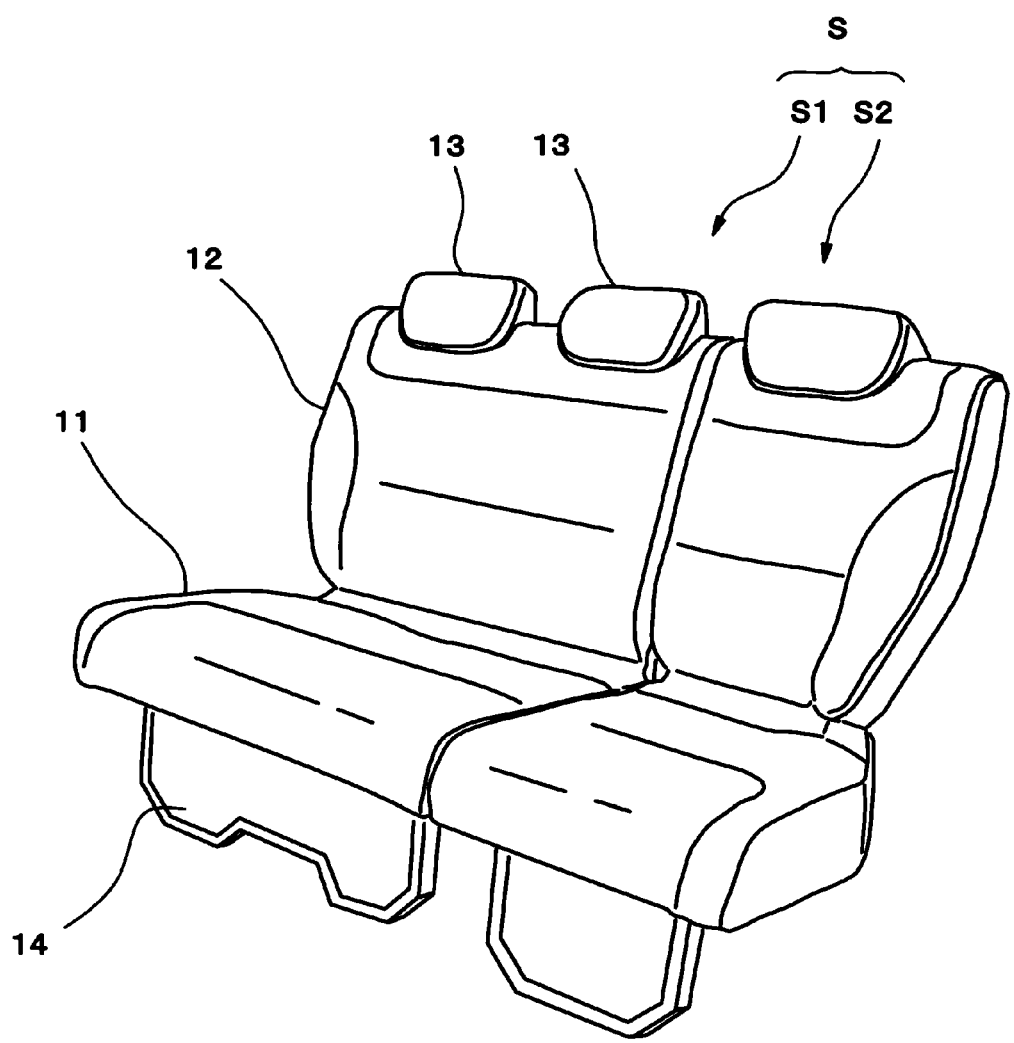
FIG. 2 is a front perspective view of the stowable vehicle seat according to the first embodiment of the present invention.
Figure 3:
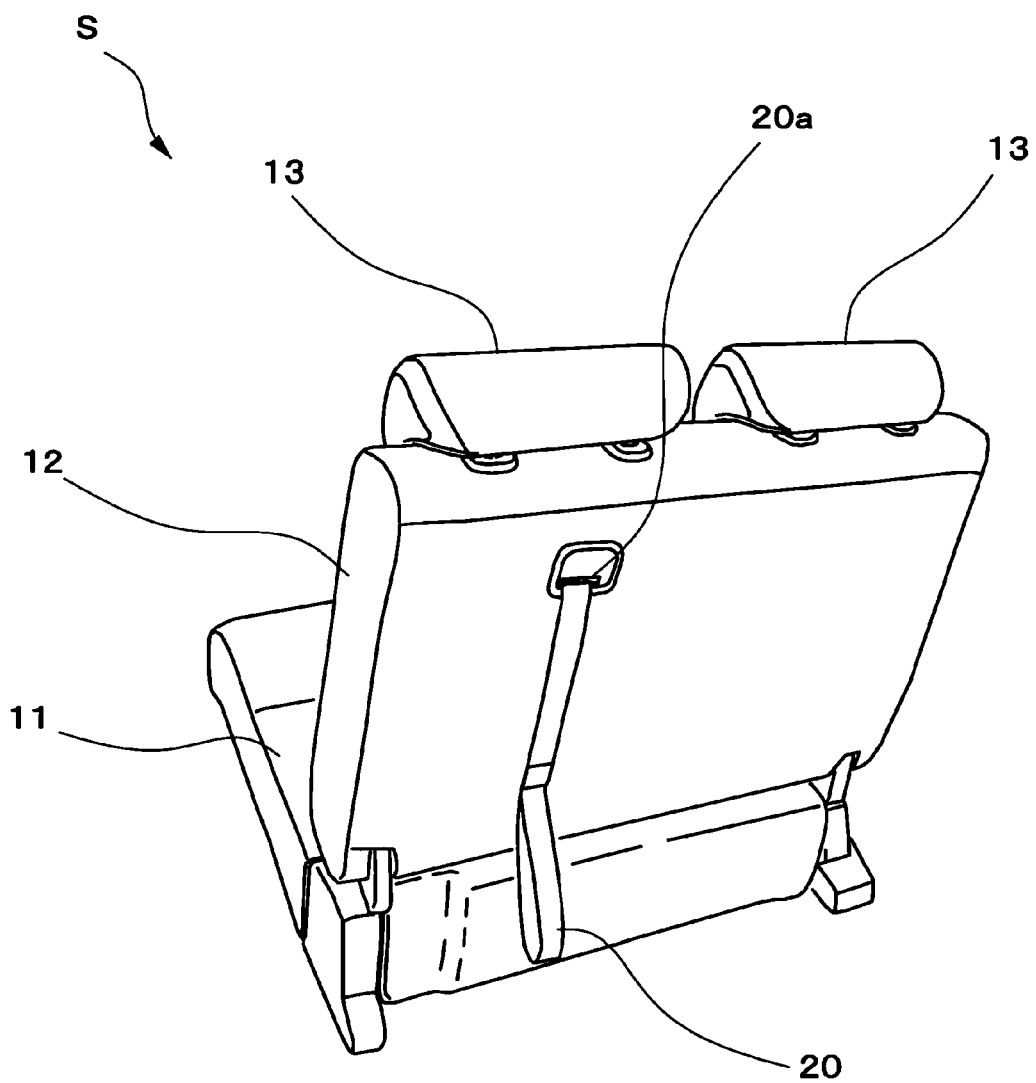
FIG. 3 is a rear perspective view of the stowable vehicle seat according to the first embodiment of the present invention.

The seat S includes a seat cushion 11, a seat back 12, headrests 13 and 13, and a front-side leg portion 14. Also, as shown in FIG. 3, from the rear surface side of the seat back 12, a strap 20, as an operating element for performing stowing and returning operations of the seat, S is extended outward from the rear surface side of the seat S.

The strap 20 is the operating element operated during the stowing and returning operations of the seat S, and a wide bendable belt of a length of approximately 1 m is extended to the outer side from a strap outlet portion 20a to facilitate the operation by a passenger. Since the stowing and returning operations of the seat S can be performed by a pulling operation of the strap 20, an operation load can be reduced as compared with an operation with a lever. In a state in which the stowing and returning operations of the seat S are not performed, a part of the strap 20 is hooked on the rear surface of the seat back 12 by a planer fastener. In this embodiment, the strap 20 is formed as a belt shape, but they may be formed as a strip shape or a pulling-lever shape. If being formed as the pulling-lever shape, it is not exposed like the strap 20, and the appearance becomes favorable.

Figure 4:
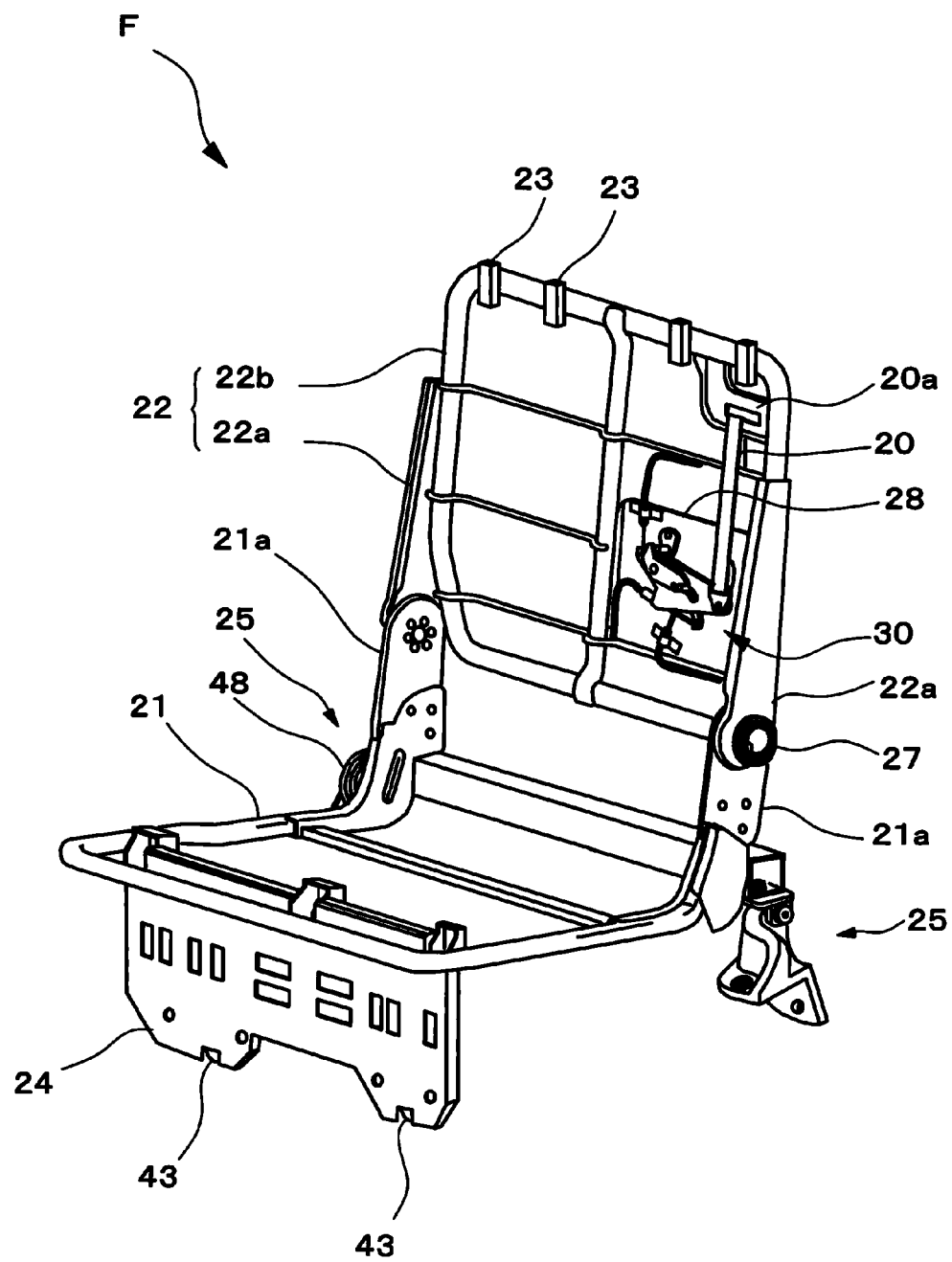
FIG. 4 is an outline perspective view of a seat frame according to the first embodiment of the present invention.

A seat frame F of the seat S shown in FIG. 4 includes a seat-cushion frame 21 constituting the seat cushion 11, a seat-back frame 22 constituting the seat back 12, and a front-side leg portion frame 24, and the seat-cushion frame 21 and the seat-back frame 22 are connected to each other through a reclining mechanism 27, while the seat-cushion frame 21 and the vehicle body floor 4 side are connected to each other through seat support portions 25 and 25 as first seat support. Also, above the seat-back frame 22, pillars of the headrest frames, not shown, are disposed through pillar support portions 23.

The seat-cushion frame 21 constitutes the seat cushion 11 which is covered by a cushion pad, cover and the like, not shown, and supports the passenger from below. The seat-cushion frame 21 has the front-side leg portion frame 24 rotatably (movably) attached to the front side. Also, at the rear end portion of the seat-cushion frame 21, back frame support portions 21a and 21a that connect to the seat-back frame 22 are disposed.

The right and left seat support portions 25 and 25 support the rear end portion side of the seat-cushion frame 21 rotatably in the front-and-rear direction, in which a coil spring 48 is attached to the one seat support portion 25 to urge the seat cushion 11 in the front rotating (movable) direction all the time.

The seat-back frame 22 constitutes the seat back 12 that is covered by a cushion pad or the like, not shown, and supports the back of a passenger from behind, and in this embodiment, it is formed by a substantially rectangular frame body. In more detail, the seat back 12 is constituted by side frames 22a and 22a and a center frame 22b. The side frames 22a and 22a are constituted by a right and left pair and formed separately in the crosswise direction of the seat-back frame 22 and extending in the vertical direction. The center frame 22b is formed by a substantially rectangular frame body sandwiched by the side frames 22a and 22a.

The lower end portion sides of the side frames 22a and 22a are connected to the back-frame support portions 21a and 21a through the reclining mechanism 27 as reclining elements.

Inside the center frame 22b, which is a frame body, a back plate 28 in a substantially plate shape is disposed along the surface supporting the back of the passenger, and on the back plate 28, a link mechanism 30, which will be described below, is disposed. Also, the strap outlet portion 20a is disposed on the upper part of the center frame 22b.

The front-side leg portion frame 24 is covered by a cover material, not shown, to constitute the front-side leg portion 14 as second seat support and supports the front side of the seat-cushion frame 21 and is connected to the vehicle body floor 4 side. The front-side leg portion frame 24 is supported on the front side of the seat-cushion frame 21 at an upper part rotatably in the front-and-rear direction, and at a lower part of the front-side leg portion frame 24, a leg-portion locking mechanism as locking and unlocking elements connected to leg-portion strikers 44 disposed on the vehicle body floor 4 side, which are lockable and unlockable.

Figure 5:
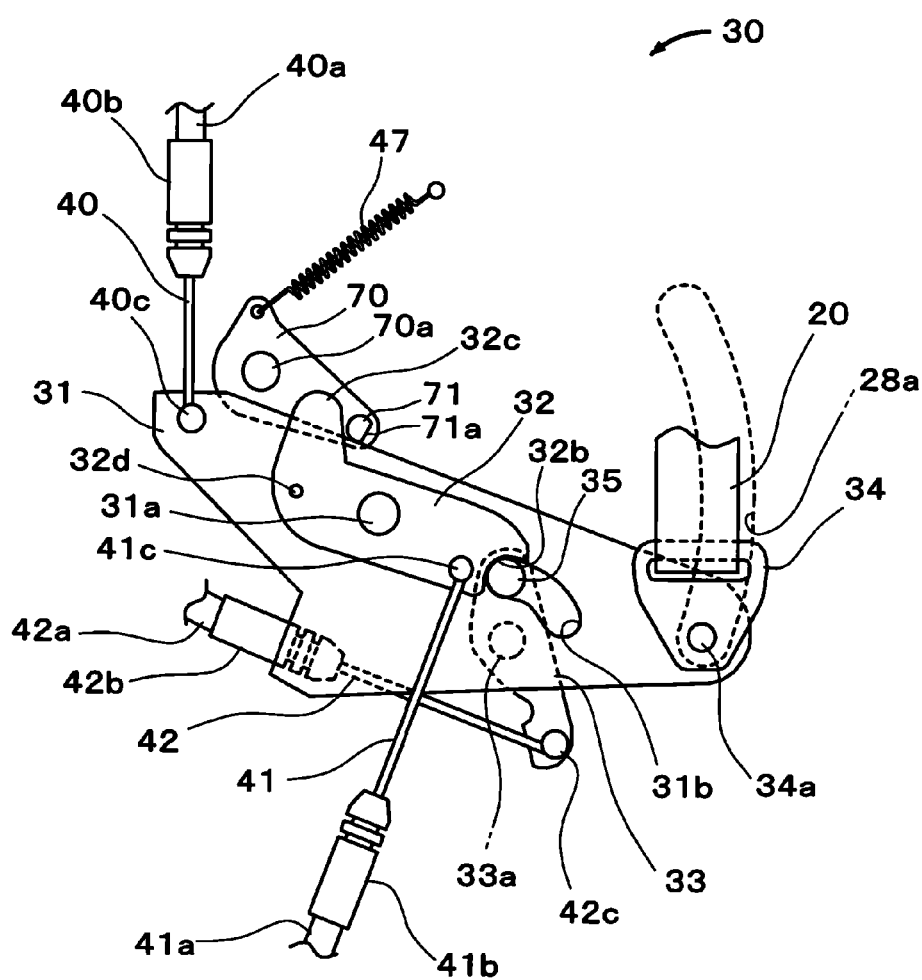
FIG. 5 is an enlarged explanatory side view diagram of a link mechanism according to the first embodiment of the present invention.

Subsequently, a configuration of the link mechanism 30 will be described referring to FIGS. 5 to 7.

The link mechanism 30 is connected to the strap 20 as the operating element and is provided with a function of appropriately unlocking the lock of the reclining mechanism 27 and the lock of the leg-portion locking mechanism in conjunction with the operation of the strap 20 and the state of the seat S and is formed on the back plate 28 as mentioned above.

The link mechanism 30 includes a first link member 31, a second link member 32, a third link member 33, and a fourth link member 70, and these link members (31, 32, 33, 70) are all attached rotatably. To the first link member 31, the second link member 32, and the third link member 33, connecting members are connected.

The connecting member includes a reclining release wire 40 connected to the reclining mechanism 27, a leg-portion release wire 41 connected to locking claws 43 and 43 of the front-side leg portion 14, a cancel wire 42 that detects a folded state of the seat back 12, and the strap 20.

The first link member 31 is a substantially inverted triangular member, which is flat in the crosswise direction, having the strap 20 connected to a locking portion 34a disposed on one end portion side through a strap connecting member 34 and the reclining release wire 40 locked to a locking portion 40c formed on the other end portion side. The first link member 31 is rotatably supported on the back plate 28 by a shaft portion 31a disposed at the center part thereof.

Also, between the shaft portion 31a of the first link member 31 and the locking portion 34a, an arc-shaped long hole 31b is formed to draw a part of a concentric circle around a shaft portion 33a, which will be described below.

The other end portion side of the strap 20 connected to the first link member 31 through the strap connecting member 34 is extended outward of the seat back 12 from a strap outlet portion 20a disposed on the rear surface of the seat back 12 easily operable by a passenger.

The locking portion 34a of the strap connecting member 34 disposed on the first link member 31 rotatably and pivotally supports the strap connecting member 34 on the first link member 31, and the other end side thereof is inserted through a guiding hold portion 28a formed in the back plate 28. Since the guiding hole portion 28a is formed in an arcuate shape to draw a part of a concentric circle of the shaft portion 31a, the locking portion 34a can move within the guiding hole portion 28a with rotation of the first link member 31. Also, by adjusting the length of the guiding hole portion 28a, upper and lower limits of a rotation amount of the first link member 31 can be set.

For the second link member 32 and the fourth link member 70, too, a projection-shaped stopper, not shown, is disposed on the back plate 28 or on the first link member 31 to arbitrarily set the upper and lower limits of the respective rotation amounts.

The second link member 32 is a substantially rectangular member and supported by the shaft portion 31a at the center part coaxially rotatably with the first link member 31. Pivotally supporting the second link member 32 coaxially with the first link member 31, reduces a cost and a weight.

On the end portion side closer to the locking portion 34a of the second link member 32, a locking recess portion 32b that is brought into contact with a first locking portion 35, which will be described below, is formed. Also, on the upper side of the end portion opposite to the locking recess portion 32b of the second link member 32, a contact portion 32c formed substantially in a semicircular projection shape is formed.

Moreover, between the shaft portion 31a and the locking recess portion 32b, a locking portion 41c to which the leg-portion release wire 41 is locked is formed.

The third link member 33 is a substantially rectangular member, arranged between the first link member 31 and the back plate 28, and has the center part supported by the shaft portion 33a rotatably to the first link member 31 side. In the lower end portion side of the third link member 33, the cancel wire 42 is locked through a locking portion 42c.

On the upper end portion side of the third link member 33, the first locking portion 35 is formed in a cylindrical shape. This first locking portion 35 is inserted through the arc-shaped long hole 31b formed in the first link member 31 and brought into contact with the locking recess portion 32b of the second link member 32 and locked so that the second link member 32 is rotated along with the first link member 31.

Here, since the first locking portion 35 is formed having an outer diameter slightly smaller than the width of the long hole 31b, while the long hole 31b is formed in an arcuate shape to draw a part of a concentric circle of the shaft portion 33a as mentioned above, it is configured so that the first locking portion 35 is moved along the long hole 31b along with the rotation of the third link member 33. Upper and lower limits in a rotation amount of the third link member 33 are adjusted by the length of the long hole 31b.

To the third link member 33, an urging spring, not shown, that urges it in a direction opposite to the direction pulled by the cancel wire 42 all the time is attached. In this case, one end portion of the urging spring is locked to the lower end portion side of the third link member 33, while the opposite end portion is locked to a lower side of the strap locking portion of the first link member 31. By attaching the urging spring to the third link member 33, the operation of the third link member 33 can be made more reliable.

In this embodiment, the third link member 33 is a detection link member that is connected through a locking rib 49 as a detection mechanism, which will be described below, and the cancel wire 42, and the detection mechanism is moved upon detection of a state in which the seat back 12 is folded.

Similarly, with regard to the first link member 31 and the second link member 32, it is preferable that urging springs, not shown, that urge each of them to the direction to return to the respective initial positions (see FIG. 9A) are attached to assist rotation of the respective link members 31 and 32. In this case, both of the first link member 31 and the second link member 32 have the urging spring with both end portions fixed between them and the back plate 28 side are attached, respectively. In the case of the second link member 32, the urging spring may be attached between that and the first link member 31. By attaching the urging spring also to the first link member 31 and the second link member 32, the operation can be made more reliable.

The fourth link member 70 is a prohibiting member in this embodiment and is made of a substantially triangular member and supported on the back plate 28 on the upper side of the first link member 31 rotatably by the shaft portion 70a. The fourth link member 70 has a second locking portion 71 formed on one end portion side and is urged by an urging spring 47 in a direction where the second locking portion 71 is brought into contact with the first link member 31 all the time. The urging force of the urging spring 47 is set at a degree that does not affect the operation of the first link member 31.

The second locking portion 71 is formed in a columnar shape with a substantially semicircular section and is arranged so that a plane portion 71a formed on a part of the second locking portion 71 is oriented in a direction opposite to a shaft portion 70a. Since the fourth link member 70 is urged by the urging spring 47, in a state in which the second link member 32 is locked by the first locking portion 35, the second locking portion 71 is brought into contact with an upper edge portion of the first link member 31.

The urging spring 47 in this embodiment has the both end portions locked to the fourth link member 70 and the back plate 28 side, but may be configured so that the both end portions are locked to the fourth link member 70 and the second link member 32. Specifically, it is preferable that the both end portions of the urging spring 47 are locked between the second locking portion 71 and a lower-side locking portion 32d (see FIG. 5) of the contact portion 32c in the second link member 32. In this case, a deflection amount of the urging spring with respect to a rotation amount of the fourth link member 70 can be made relatively small. Thus, the small-sized urging spring 47 can be used, and a weight and a cost of the link mechanism 30 can be reduced.

In this embodiment, the second locking portion 71 is formed in a columnar shape with a substantially semicircular section, but it may be formed in a cylindrical or a square columnar shape or may be formed in a projection shape by bending a part of the fourth link member 70. By making the second locking portion 71 cylindrical, it can be manufactured with a lower cost, and by making it in a square column, the number of components and a cost can be reduced.

Here, the other end portion side of the connecting member locked to the link mechanism 30 will be described referring to FIGS. 6 and 7.

First, the other end portion side of the reclining release wire 40 locked to the first link member 31 will be described below.

Figure 6:
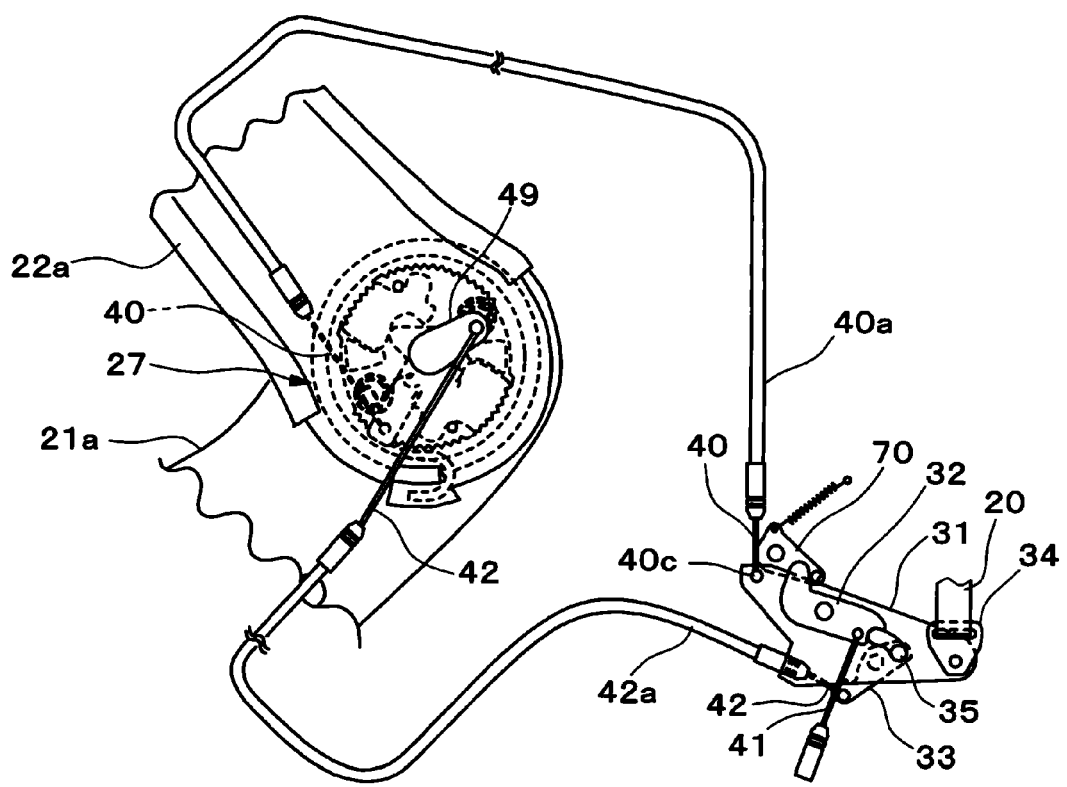
FIG. 6 is an outline explanatory side view diagram of the link mechanism in a state in which a seat back is folded according to the first embodiment of the present invention.

As shown in FIG. 6, the other end portion side of the reclining release wire 40 locked to the locking portion 40c of the first link member 31 is guided by a reclining release cable 40a and connected to the reclining mechanism 27 that performs a locking and unlocking operation of reclining of the seat back 12.

The reclining mechanism 27 unlocks a lock state of the reclining mechanism 27 and makes reclining adjustment of the seat back 12 possible when the reclining release wire 40 is pulled by the operation of the link mechanism 30 toward the link mechanism 30 side.

Figure 7:
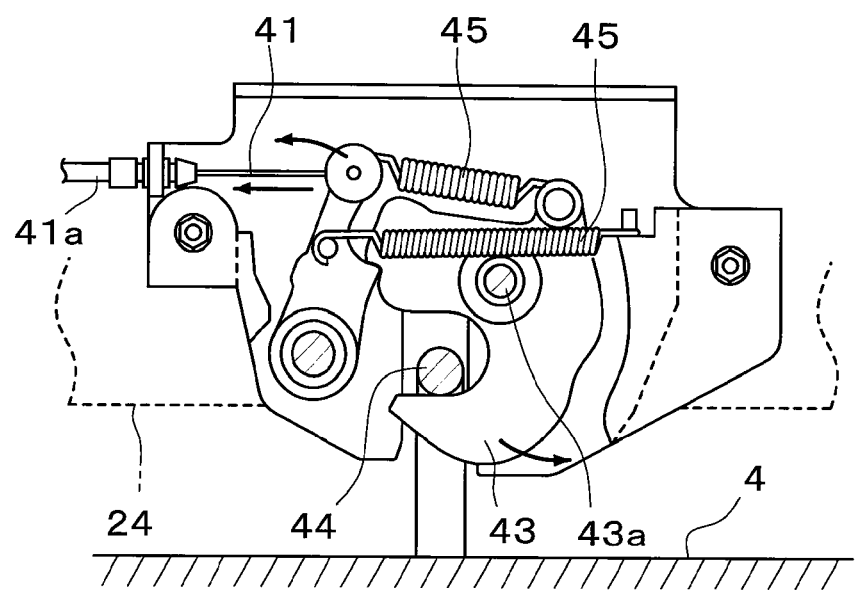
FIG. 7 is an outline explanatory side view diagram of a locking portion of a front-side leg portion according to the first embodiment of the present invention.

As shown in FIG. 7, the other end portion side of the leg-portion release wire 41 locked to the locking portion 41c of the second link member 32 is guided by a leg-portion release cable 41a and connected to the leg-portion locking mechanism. The leg-portion locking mechanism is formed at two spots on the lower side of the front-side leg portion 14, but they have the same configuration, and an arbitrary one will be described.

If the leg-portion release wire 41 is pulled by the operation of the link mechanism 30 toward the link mechanism 30 side, in the leg-portion locking mechanism, the locking claw 43 connected to the leg-portion release wire 41 is rotated around a rotation shaft 43a, lock with the leg-portion striker 44 on the vehicle body floor 4 side is unlocked, and the seat cushion 11 is brought into a state rotatable in the front-and-rear direction.

The locking claw 43 is urged by an urging spring 45 to rotate in a direction where the lock state with the leg-portion striker 44 is maintained all the time.

The other end portion side of the cancel wire 42 locked to the third link member 33 will be described below.

As shown in FIG. 6, the other end portion side of the cancel wire 42 locked to the locking portion 42c of the third link member 33 is guided by a cancel cable 42a and connected to a locking rib 49 formed on the reclining mechanism 27. The locking rib 49 is attached to rotate along with the side frame 22a in the reclining mechanism 27. That is, in this embodiment, the other end portion of the cancel wire 42 is locked to the locking rib 49, and in a state in which the seat back 12 is folded, the locking rib 49 is configured as a detection mechanism to pull the locking portion 42c formed on the third link member 33 through the cancel wire 42.

The reclining elements include the detection mechanism and the reclining mechanism 27.

An end portion member 40b, which is an end portion on the link mechanism 30 side of the reclining release cable 40a that guides the reclining release wire 40, is secured by a bracket, not shown, on the back plate 28. Similarly, an end portion member 41b on the link mechanism 30 side that guides the leg-portion release wire 41 is also secured by a bracket, not shown, on the back plate 28. Also, an end portion member 42b on the link mechanism 30 side that guides the cancel wire 42 is similarly secured to the first link member 31.

Subsequently, a relationship between the operation of the link mechanism 30 and the other end portion side of the connecting member will be described.

While the third link member 33 is not rotated, since the second link member 32 is rotated along with the first link member 31, the reclining release wire 40 and the leg-portion release wire 41 can be pulled by the pulling operation of the strap 20, and the lock between the reclining mechanism 27 and the leg-portion locking mechanism can be unlocked.

The fourth link member 70 is urged by the urging spring 47. Thus, the second locking portion 71 disposed on the fourth link member 70 is brought into contact with the upper edge portion of the first link member 31 all the time. The first link member 31 is rotated by the pulling operation of the strap 20, and the fourth link member 70 is rotated with the urging force of the urging spring 47 with the operation of the first link member 31. When the first link member 31 is rotated to a predetermined rotational angle, the plane portion 71a of the second locking portion 71 is brought into a state of planar contact with the upper edge portion of the first link member 31. By way of the planar contact of the plane portion 71a, the rotation of the fourth link member 70 is locked.

Since the plane portion 71a becomes immovable in contact with the upper edge portion of the first link member 31, even if the pulling operation of the strap 20 is stopped, the first link member 31 cannot be rotated to the direction to return to the initial position, and the rotation is prohibited at the predetermined rotational angle. The predetermined rotational angle is set at an angle that can unlock the reclining mechanism 27.

That is, even if the pulling of the strap 20 is stopped by the fourth link member 70 in the middle of the stowing operation, the link mechanism 30 is maintained at a predetermined rotation (moved) position, and the reclining mechanism 27 is maintained in the unlocked state. Therefore, the problem that the reclining mechanism 27 is locked with the seat back 12 left open and cannot be stowed does not occur.

If the seat back 12 is folded, the cancel wire 42 is pulled by the rotation of the locking rib 49, the third link member 33 is rotated, and the first locking portion 35 secured to the third link member 33 is moved along the long hole 31b. Since the second link member 32 is no longer in contact with the first locking portion 35 at the locking recess portion 32*b* due to the rotation of the third link member 33, the lock between the first link member 31 and the second link member 32 is unlocked.

At this time, the leg-portion release wire 41 is pulled by the urging spring 45 disposed on the other end portion side of the leg-portion release wire 41 locked to the second link member 32, and the second link member 32 is rotated.

By way of the rotation of the second link member 32, the contact portion 32*c* attached to the upper side of the second link member 32 pushes the second locking portion 71 and rotates the fourth link member 70. As mentioned above, the lock state of the first link member 31 by the fourth link member 70 is unlocked.

That is, when the seat back 12 is folded, the leg-portion locking mechanism is locked, and the reclining mechanism 27 is brought into a state in which it can be locked again.

The rotation configuration of the fourth link member 71 can be also made by directly bringing the upper edge portion of the second link member 32 into contact with the second locking portion 71 of the fourth link member 70. This reduces a weight and a cost of the components.

By forming the contact portion 32*c* formed on the second link member 32 in the upward projection shape, arrangement freedom of the second link member 32 is improved. Also, as a result, the contact portion reliably pushes the second locking portion 71.

Subsequently, referring to FIGS. 8 to 11, the stowing and returning operations of the seat S according to this embodiment and the operation of the link mechanism 30 will be described.

First, the stowing operation of the seat S will be described according to FIGS. 8A-E.

Figure 8A:
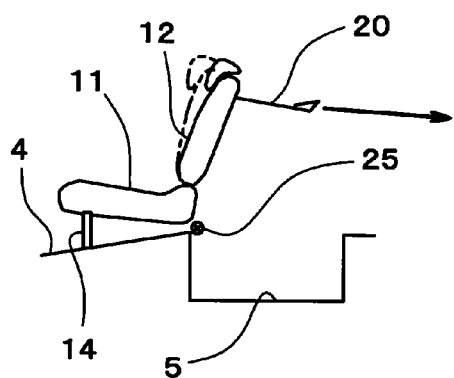
FIGS. 8A-E are explanatory side view diagrams illustrating an operation procedure in a stowing operation of the stowable vehicle seat according to the first embodiment of the present invention.

FIG. 8A shows a state in which the strap 20 is pulled rearward in a seat installation state. When the strap 20 is pulled rearward by a passenger, the reclining mechanism 27 is unlocked.

At this time, the seat back 12 to which the strap 20 is attached is urged to the forward direction by a coil spring, not shown, attached to the reclining mechanism 27. If the strap 20 is pulled against the urging direction, the locking claws 43 and 43 of the front-side leg portion 14 are unlocked by a stress lower than a stress to fold the seat back 12 rearward.

Figure 8B:
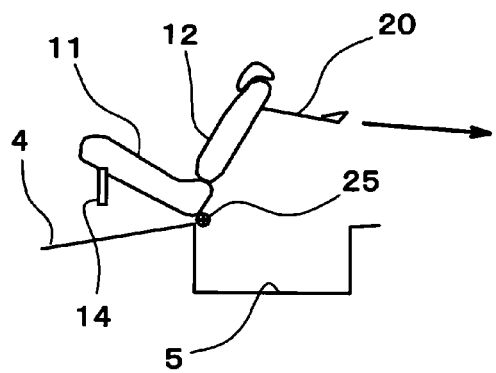

FIG. 8B shows a state in which the locking claws 43 and 43 of the front-side leg portion 14 are unlocked. That is, the locking claws 43 and 43 of the front-side leg portion 14 are unlocked, and the seat S is made rotatable rearward.

Figure 8C:
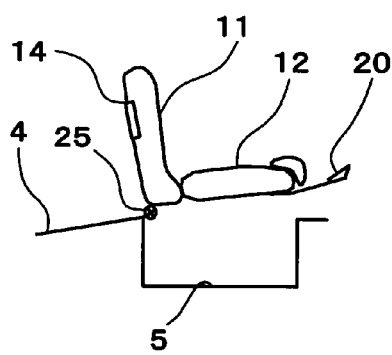
Figure 8D:
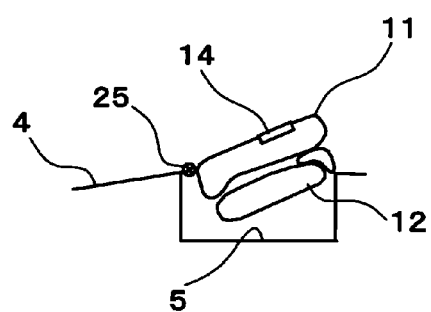

FIGS. 8C and 8D show a state in which the rearward rotation of the seat S progresses. The center of gravity of the seat S exceeds a middle point of rotation and thereafter, the seat S is rotated rearward by its own weight and reaches the stowed state.

At this time, even if the pulling speed or the pulling load of the strap 20 is changed or the pulling operation is stopped, the unlocked state of the reclining mechanism 27 is maintained, and the seat back 12 is folded by the urging force of a coil spring, not shown, attached to the reclining mechanism 27.

If the seat back 12 is brought into the folded state, the reclining mechanism 27 is locked again. Since the seat back 12 will not open, it can be smoothly stowed.

Also, the rearward rotation speed of the seat S is reduced by the coil spring 48 attached to the seat support portion 25, and an impact generated during the stowage into the stowage recess portion 5 is alleviated.

The front-side leg portion 14 is folded to the seat cushion 11 side by its own weight along with the rotation of the seat S.

Figure 8E:
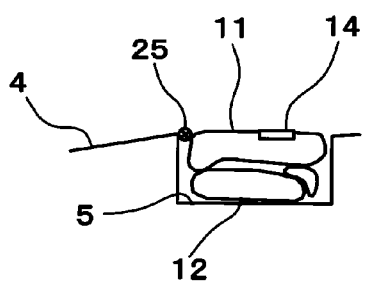

FIG. 8E shows a stowed state of the seat S. In this state, an opening portion of the stowage recess portion 5 forms a flat surface integral with the rear surface of the seat cushion 11, and a large trunk is ensured. In order to suppress rattling of the seat S in the stowed state during driving of the vehicle, a locking mechanism that locks and unlocks the rear surface of the seat back 12 and the bottom portion of the stowage recess portion 5 may be disposed.

An operation of the link mechanism 30 during the stowing operation of the above-mentioned seat S will be described according to FIGS. 9A-D.

Figure 9A:
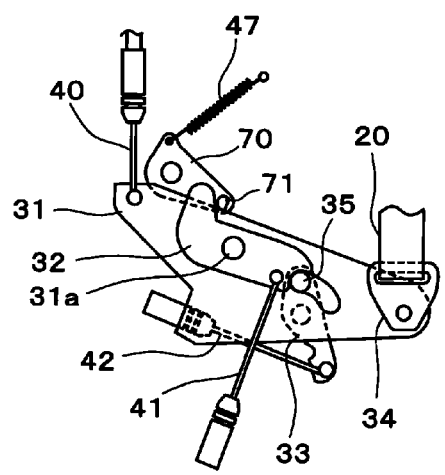
FIGS. 9A-D are operation explanatory side view diagrams of the link mechanism in the stowing operation of the stowable vehicle seat according to the first embodiment of the present invention.

FIG. 9A shows a state of the link mechanism 30 in the installed state of the seat S, which is a stage prior to the operation of the strap 20 by the passenger. The state of the link mechanism 30 at this time is referred to as an initial position.

Figure 9B:
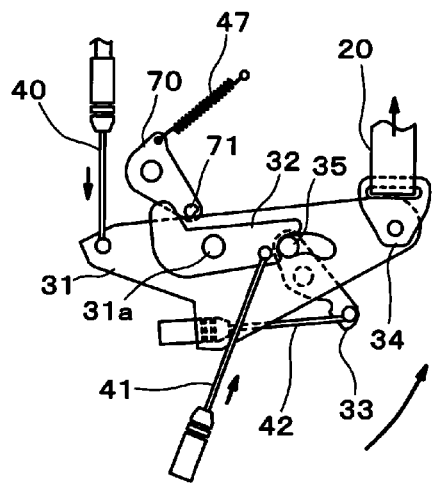

FIG. 9B shows a state of the link mechanism 30 when the reclining mechanism 27 is unlocked (FIG. 8B), which is a stage when the strap 20 is somewhat pulled rearward.

Since the first link member 31 is rotated in the direction pulled by the operation of the strap 20, the reclining release wire 40 is pulled with the rotation, and the reclining mechanism 27 is unlocked. At this time, since the seat back 12 is in the raising state with respect to the seat cushion 11, the cancel wire 42 is not pulled, the second link member 32 is rotated along with the first link member 31, and the leg-portion release wire 41 is also pulled. However, the lock by the locking claws 43 and 43 connecting the front-side leg portion 14 and the vehicle body floor 4 side is set to not be unlocked by the pulled amount in this state, and the lock of the leg portion is maintained.

Figure 9C:
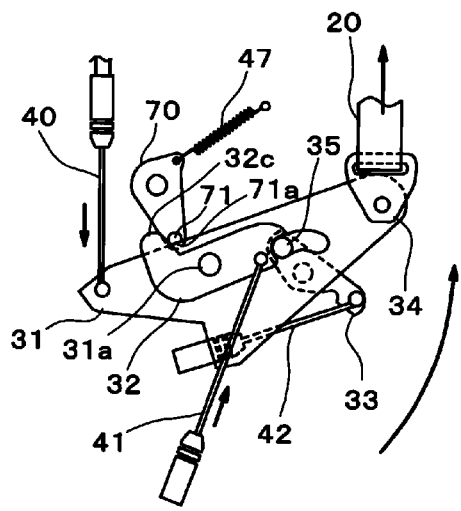

FIG. 9C shows a state (FIG. 8B) of the link mechanism 30 when the lock between the reclining mechanism 27 and the locking claws 43 and 43 of the front-side leg portion 14 is unlocked and the strap 20 is further pulled. By pulling the strap 20 more strongly than the state in FIG. 9B, the second link member 32 is also rotated largely along with the first link member 31. The reclining release wire 40 and the leg-portion release wire 41 are further pulled along with this rotation. At this time, the leg portion is unlocked.

In the state (FIG. 8C) of the link mechanism 30 shown in FIG. 9C, the plane portion 71*a* of the second locking portion 71 has been rotated to a position for making planar contact with the upper edge portion of the first link member 31. At this time, by changing the pulling speed or the pulling load of the strap 20 or by stopping the pulling operation, the first link member 31 is brought into contact with the plane portion 71*a*. By way of the contact with the plane portion 71*a*, the first link member 31 is prohibited from rotating in a direction to return to the initial position, and thus, the link mechanism 30 is maintained at the predetermined rotation (moved) position and the unlocked state of the reclining mechanism 27 is maintained.

Also, the center of gravity of the seat S exceeds the middle point of the rotation, and thereafter, the seat S is rotated rearward by its own weight and reaches the stowed state. The seat back 12 is folded by the urging force of the coil spring, not shown, attached to the reclining mechanism 27.

Figure 9D:
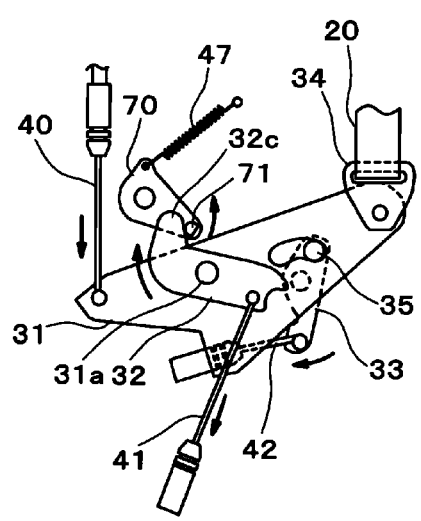

FIG. 9D shows a state of the link mechanism 30 in the final stage of the stowing and rotation (FIG. 8D). Since the seat back 12 is folded, the third link member 33 is rotated, and the lock between the first link member 31 and the second link member 32 is unlocked. In this state, since the second link member 32 is rotated with respect to the first link member 31, the leg-portion release wire 41 is not pulled, and the leg-portion locking mechanism is locked. However, since it is already located far from the striker 44, the stowing operation of the seat S is not affected.

Also, since the second link member 32 is rotated and pushes the second locking portion 71 with the contact portion 32c, the fourth link member 70 is retreated from the position that locks the first link member 31. As mentioned above, the first link member 31 is returned to the rotatable state.

In the stowed state (FIG. 8E) of the seat S, since the seat back 12 is folded onto the seat cushion 11, the cancel wire 42 is pulled and the third link member 33 is maintained in the rotated state. At this time, the first link member 31 is maintained at the position before the rotation since the pulling operation of the strap 20 is not performed in the stowed state of the seat S.

Subsequently, the returning operation of the seat S will be described according to FIGS. 10A-E.

Figure 10A:
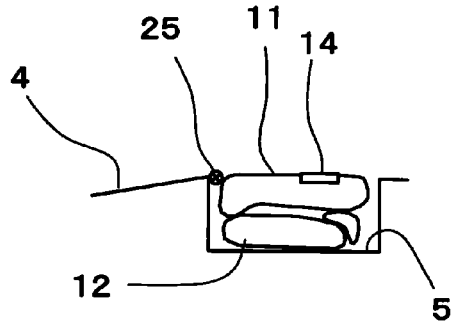
FIGS. 10A-E are explanatory side view diagrams illustrating an operation procedure in a returning operation of the stowable vehicle seat according to the first embodiment of the present invention.

FIG. 10A shows a state in which the seat S is stowed. By pulling up a grip, not shown, disposed on the rear surface side of the seat cushion 11, the seat S can be rotated and operated in the returning rotating direction.

Figure 10B:
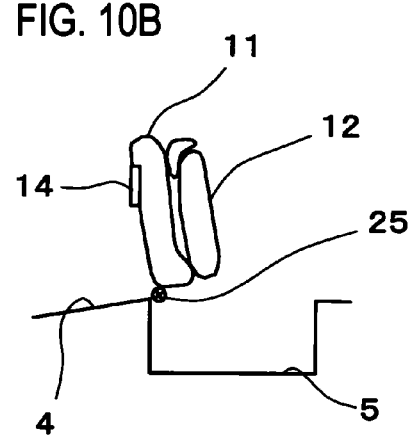

FIG. 10B shows a state of the returning rotation of the seat S. The operation load is reduced due to being urged by the coil spring 48 attached to the seat support portion 25 in the returning rotating direction.

Along with the forward rotation of the seat S, the front-side leg portion 14 is rotated and extended downward by its own weight.

Figure 10C:
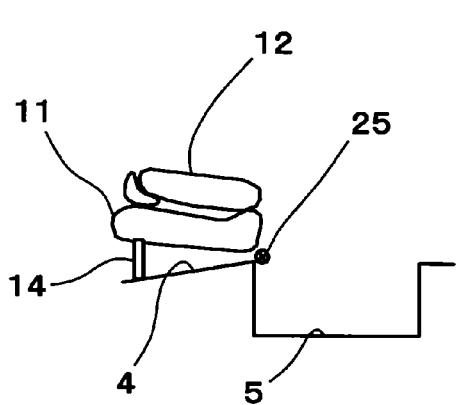

FIG. 10C shows a state in which the locking claws 43 and 43 of the front-side leg portion 14 of the seat S are locked to the vehicle body floor 4 side. The locking claws 43 and 43 are locked to the leg-portion striker 44 on the vehicle body floor 4 side by a pressure of the weight of the seat S.

Figure 10D:
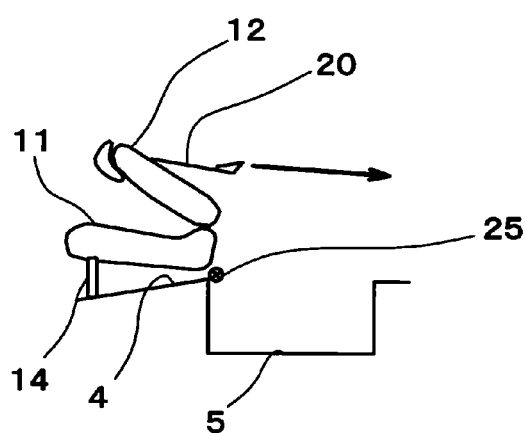

FIG. 10D shows an operation to pull the strap 20 rearward from the state in which the locking claws 43 and 43 of the front-side leg portion 14 of the seat S are locked to the leg-portion striker 44 on the vehicle body floor 4 side.

Figure 10E:
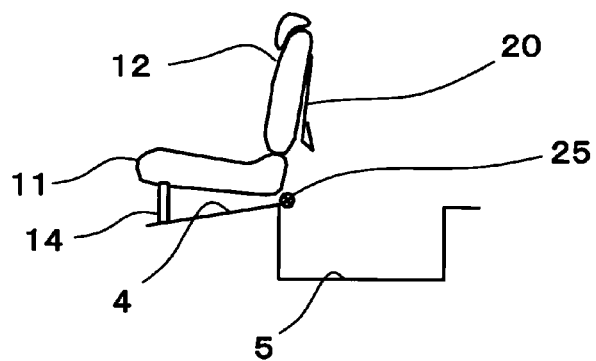

FIG. 10E shows a state in which the returning operation of the seat S is completed.

That is, the passenger can return the seat S only through the operation to pull the return strap 20 rearward after gripping the grip of the seat cushion 11 in the state in which the seat back 12 is folded and stowed and rotating it forward.

The operation of the link mechanism 30 during the above-mentioned returning operation of the seat S will be described according to FIGS. 11A-C.

FIG. 11A shows a state of the link mechanism 30 from the stowed state (FIG. 10A) of the seat S to a stage (FIG. 10C) in which the seat S is rotated and the locking claws 43 and 43 are locked to the vehicle body floor 4 side. This is the state before the strap 20 is operated by the passenger, and since it is in the state in which the seat back 12 is folded, the cancel wire 42 is pulled, and the third link member 33 is rotated.

FIG. 11B shows a stage (FIG. 10D) in which the strap 20 is somewhat pulled rearward in order to raise the seat back 12. By way of the operation of the strap 20, the seat back 12 can be made to raise. By raising of the seat back 12, the cancel wire 41 is returned to the state in which the wire is not pulled, and thus, the third link member 33 is returned to a position that locks the second link member 32. However, since the pulling operation of the strap 20 is being performed even if the third link member 33 is rotated, the second link member 32 is not locked to the third link member 33.

Also, in this state, since the leg-portion release wire 41 is not pulled even if the strap 20 is operated, the lock state of the locking claws 43 and 43 is maintained.

Even if the first link member 31 is rotated to the lock position by the pulling operation of the strap 20 at this time, since the second locking portion 71 of the fourth link member 70 is pressed in the rotation direction by the contact portion 32c of the second link member 32, it cannot lock the first link member 31. Therefore, by stopping the pulling operation of the strap 20, the first link member 31 is rotated from the rotation (moved) position to the direction of the initial position, and the reclining mechanism 27 is locked.

If the pulling operation of the strap 20 is stopped after the seat back 12 is made to raise, the second link member 32 is also returned to the initial position, by which the second link member 32 is locked to the first link member 31 by the third link member 33, and each link member of the link mechanism 30 is returned to the state of the initial positions (See FIG. 9A).

Second Embodiment

FIGS. 12 to 17 show a second embodiment of the present invention. In the following embodiment, the same reference numerals are given to the same members, arrangements and the like as those in the first embodiment, and the detailed description thereof will be omitted.

Figure 12:
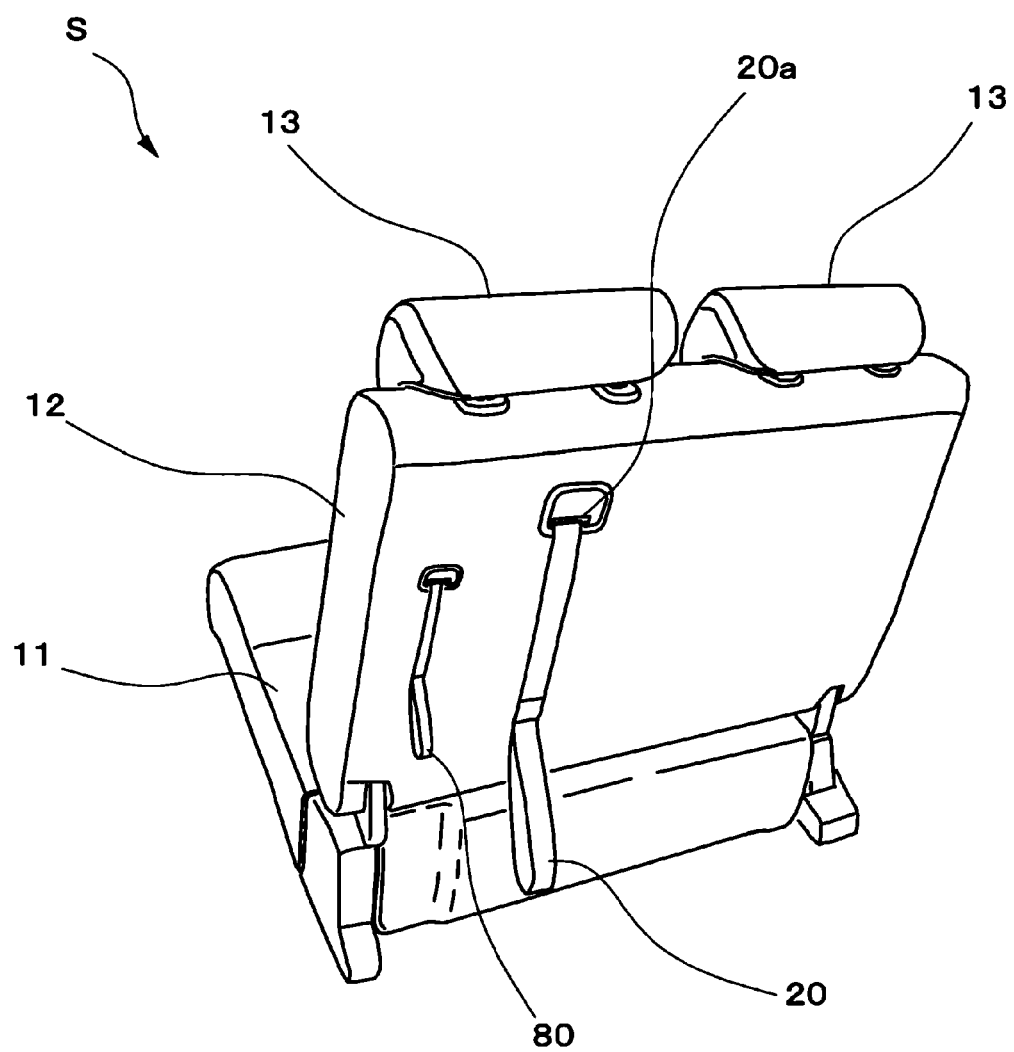
FIG. 12 is a rear perspective view of a stowable vehicle seat according to a second embodiment of the present invention.

As shown in FIG. 12, in the seat S of this embodiment, a return strap 80 that is pulled when the seat back 12 is to raise during the returning operation is extended outward from the rear surface side of the seat S separately from the strap 20 as the operating element for performing the stowing operation of the seat S. The return strap 80 is formed by a wide bendable belt similarly to the strap 20. In a state in which the stowing and returning operations of the seat S are not performed, parts of the strap 20 and the return strap 80 are hooked on the rear surface of the seat back 12 by a planer fastener.

In this embodiment, the strap 20 and the return strap 80 are formed as a belt shape, but they may be formed as a strip shape or a pulling-lever shape. If being formed as the pulling-lever shape, it is not exposed like the strap, and the appearance becomes favorable.

Moreover, the seat S is configured to be provided with the return strap 80, but it may be configured to not be provided with the return strap 80, or a part of the seat S may be formed in a grip shape instead of the return strap 80.

Figure 13:
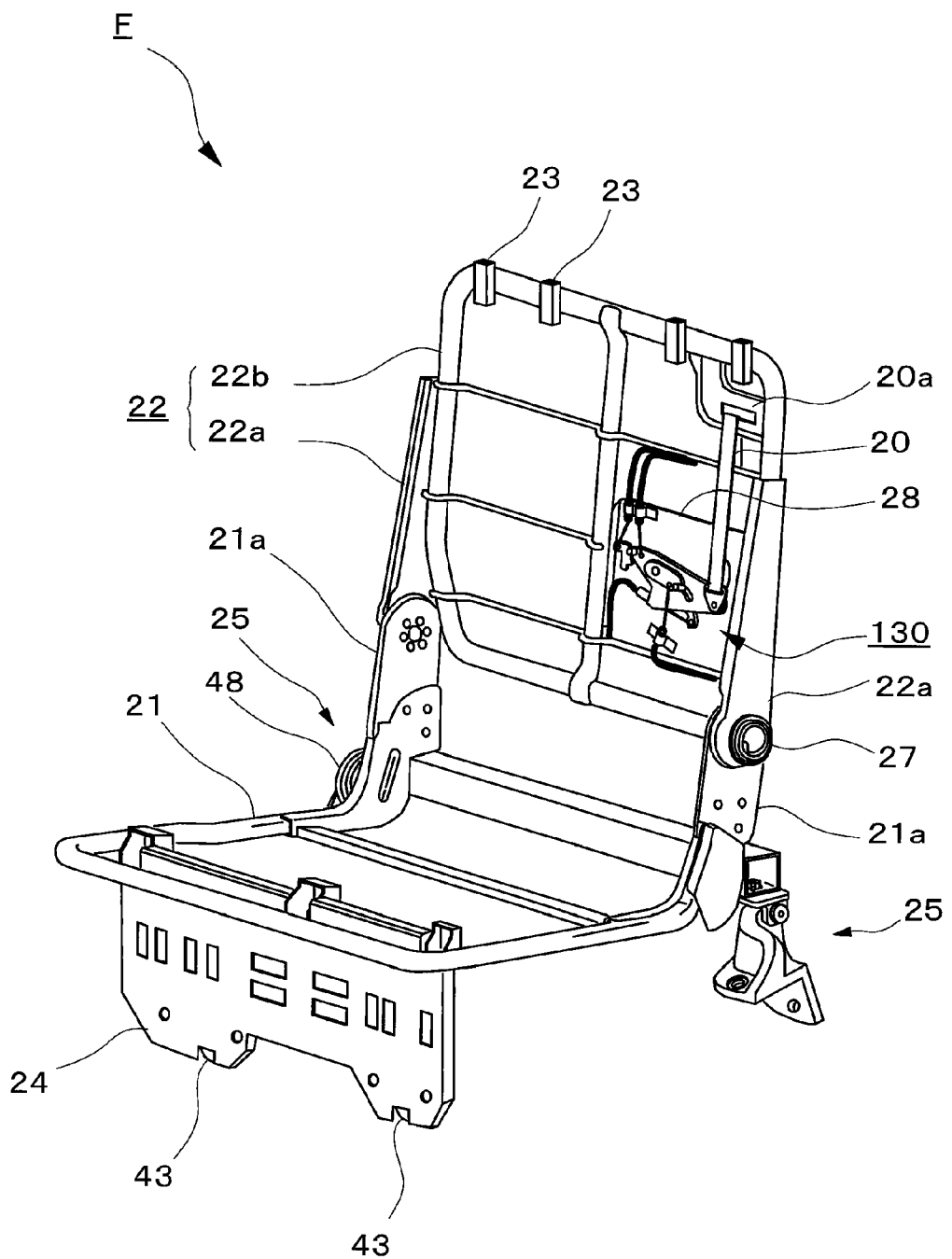
FIG. 13 is an outline perspective view of a seat frame according to the second embodiment of the present invention.

In the seat frame F of this embodiment, as shown in FIG. 13, a link mechanism 130 is disposed on the back plate 28.

Figure 14:
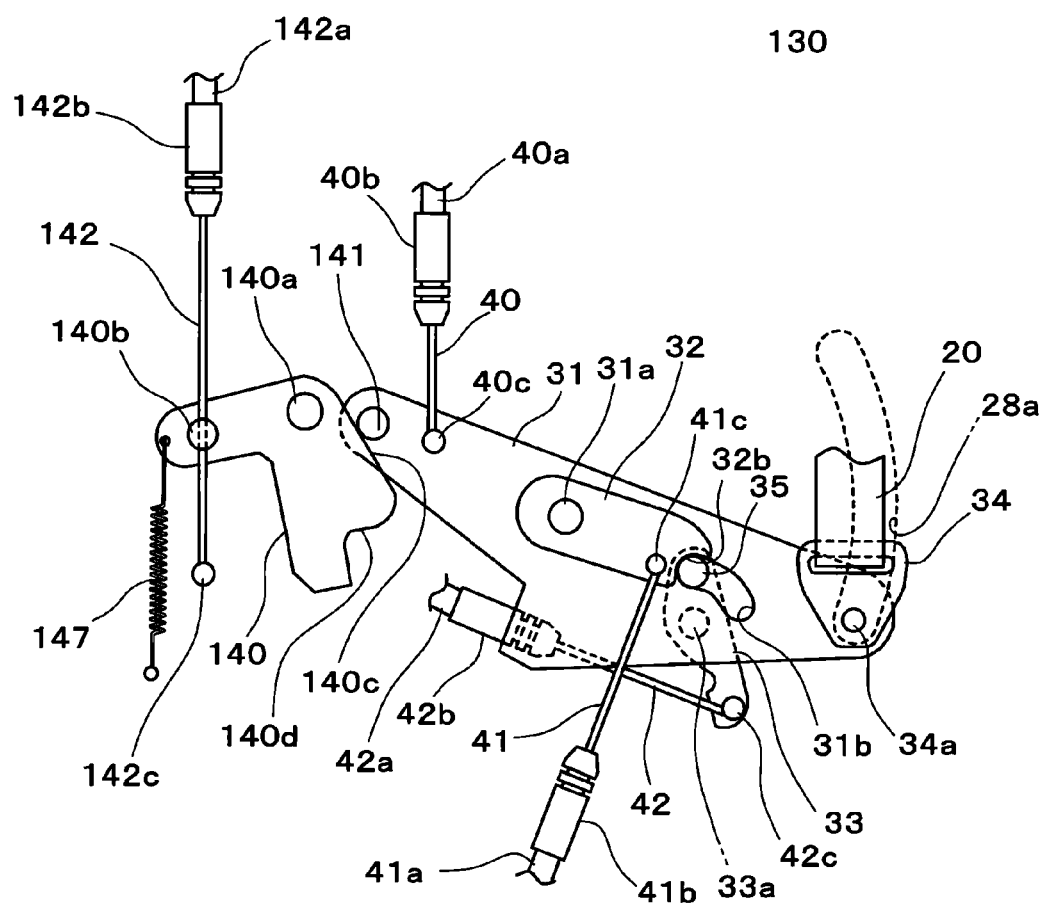
FIG. 14 is an enlarged explanatory side view diagram of a link mechanism according to the second embodiment of the present invention.

The link mechanism 130 of this embodiment will be described referring to FIGS. 14 and 15.

The link mechanism 130 of this embodiment is connected to the strap 20 used for the stowing operation of the seat S and is provided with a function of appropriately unlocking the reclining mechanism 27 and the lock between the front-side leg portion 14 and the vehicle body floor 4 in conjunction with the operation of the strap 20 and the state of the seat S and is formed on the back plate 28 as mentioned above.

The link mechanism 130 includes the first link member 31, the second link member 32, the third link member 33, and a fourth link member 140, and these link members (31, 32, 33, 140) are all attached rotatably. To each of the link members (31, 32, 33, 140), a connecting member is connected.

The first link member 31, the second link member 32, and the third link member 33 are, similarly to the first embodiment mentioned above, connected to the reclining release wire 40, the leg-portion release wire 41 connected to the locking claws 43 and 43 of the front-side leg portion 14, and the cancel wire 42 that detects a state in which the seat back 12 is folded which are connected to the reclining mechanism 27, respectively. The fourth link member 140 is connected to a second cancel wire 142 that detects the state in which the seat back 12 is folded.

The first link member 31 of this embodiment has a locking projection 141 disposed on the end portion side opposite to the position where the strap connecting member 34 is attached and on the end portion side rather than the locking portion 40c that locks the reclining release wire 40. The locking projection 141 is a substantially cylindrical member attached in the projection shape.

The second link member 32 of this embodiment is a substantially rectangular member which is long from the shaft portion 31a to the side where the strap 20 is attached and short from the shaft portion 31a to the side opposite to the strap attached side and is rotatably supported by the shaft portion 31a coaxially with the first link member 31.

The third link member 33 of this embodiment has the same member, shape and the like as those in the first embodiment, and is similarly connected to the locking rib 49 as the detection mechanism through the cancel wire 42 and is one of the detection link members in this embodiment.

The fourth link member 140 of this embodiment is a prohibiting member in this embodiment and is formed by a substantially key-shaped member and rotatably supported by a shaft portion 140a on the back plate 28 on the side of a locking projection 141 of the first link member 31. The fourth link member 140 is urged by an urging spring 147 in a direction that is brought into contact with the locking projection 141 all the time. Also, on the first link member 31 side of the fourth link member 140, an inclination portion 140c and a second locking portion 140d are formed. The inclination portion 140c is a portion whose width is enlarged and which is inclined from the fourth link member 140 to the first link member 31 side, and the second locking portion 140d is a notch-shaped portion formed such that a part of the lower side of the inclination portion 140c is cut off.

Also, on the side of the fourth link member 140 opposite to the first link member 31, a locking portion 140b that locks the second cancel wire 142 is formed. The urging force of the urging spring 147 is set at a degree that does not affect the operation of the first link member 31.

Since the fourth link member 140 is urged by the urging spring 147, in the installed state of the seat S, the inclination portion 140c is brought into contact with the locking projection 141.

Also, the cancel wire 142 connected to the fourth link member 140 has an anchor 142c secured to the end portion and a wire portion is movably inserted through the locking portion 140b. If the cancel wire 142 is pulled to the reclining mechanism 27 side, the anchor 142c is locked to the locking portion 140b, and the locking portion 140b can be pulled.

The cancel wire 142 is one of the cancel wires 42 connected to the third link member 33 and bifurcated in the middle.

In this embodiment, the second locking portion 140d is disposed on the fourth link member 140 and the locking projection 141 on the first link member 31, but it may be configured so that the second locking portion 140d is disposed on the first link member 31 and the locking projection 141 on the fourth link member 140.

Also, the locking projection 141 is formed in the cylindrical shape but it may be formed in a square columnar shape or in a projection shape by bending a plate member. By forming the locking projection 141 by bending a part of the first link member 31, the number of components and a cost can be reduced.

Figure 15:
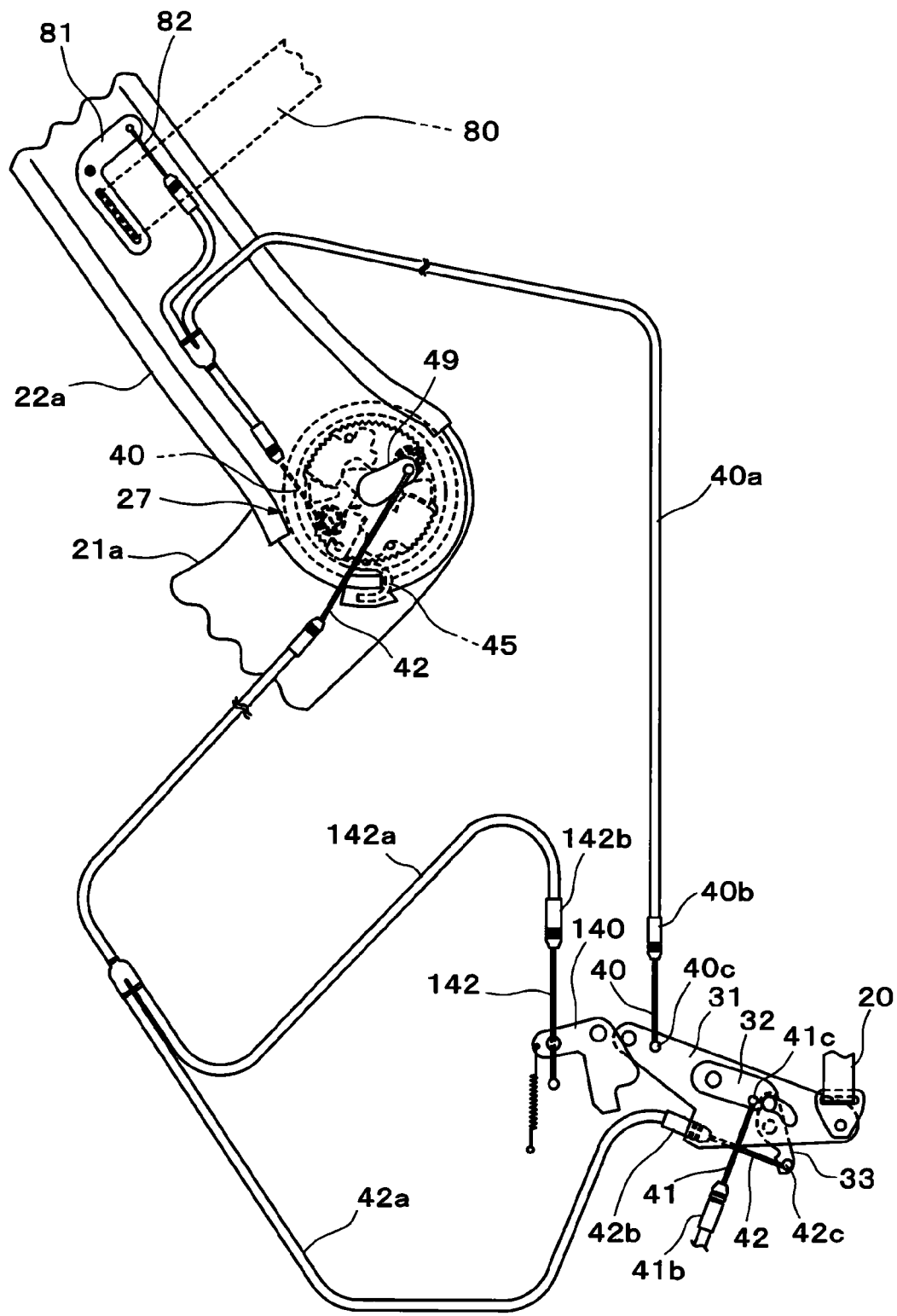
FIG. 15 is an outline explanatory side view diagram of the link mechanism in a state in which a seat back is folded according to the second embodiment of the present invention.

As shown in FIG. 15, in this embodiment, the cancel wire 42 connected to the locking rib 49 as the detection mechanism is bifurcated, one of which is guided by the cancel cable 42a and connected to the third link member 33 as the cancel wire 42, while the other is guided by the cancel cable 142a and connected to the fourth link member 140 as the cancel wire 142. As will be described below, when the seat back 12 is folded, the fourth link member 140 is pulled by the cancel wire 142 and rotated. That is, in this embodiment, the fourth link member 140 is also one of the detection link members.

An end portion member 142b on the link mechanism 130 side that guides this cancel wire 142 is secured onto the back plate 28 by a bracket, not shown, similarly to the other wire end portion members.

Subsequently, the operation of the link mechanism 130 and the relationship with the other end portion sides of the connecting members will be described.

Since the fourth link member 140 is urged by the urging spring 147 all the time, the inclination portion 140c disposed on the fourth link member 140 is brought into contact with the locking projection 141 of the first link member 31 all the time. Thus, if the strap 20 is pulled, the locking projection 141 is brought into sliding contact with the inclination portion 140c along with the rotation of the first link member 31. Here, if the first link member 31 is rotated to the predetermined rotational angle, the locking projection 141 is locked to the second locking portion 140d located on the lower side of the inclination portion 140c, and the rotation of the first link member 31 is prohibited at the predetermined rotational angle. The predetermined rotational angle is set at an angle that can unlock the reclining mechanism 27. Even if the pulling operation of the strap 20 is stopped in this state, the first link member 31 cannot be rotated in the direction to return to the initial position.

That is, even if the pulling operation of the strap 20 is stopped by the fourth link member 140 in the middle of the stowing operation, the link mechanism 130 is maintained at the predetermined rotation (moved) position, and the reclining mechanism 27 is maintained in the unlocked state. Therefore, the nonconformity that the reclining mechanism 27 is locked with the seat back 12 left open and cannot be stowed does not occur.

If the seat back 12 is folded, the locking rib 49 is rotated, the cancel wires 42 and 142 are pulled, and the third link member 33 and the fourth link member 140 are rotated.

If the third link member 33 is rotated, the first locking portion 35 secured to the third link member 33 is moved along the long hole 31b. By the movement of the first locking portion 35, the contact with the first locking portion 35 at the locking recess portion 32b is lost, and the lock between the first link member 31 and the second link member 32 is unlocked.

At this time, even if the first link member 31 is rotated by the pulling operation of the strap 20, the second link member 32 is not rotated any more, and the leg-portion release wire 41 locked to the second link member 32 cannot be pulled even if the first link member 31 is rotated.

If the fourth link member 140 is rotated, the locking projection 141 locked to the second locking portion 140d is unlocked, and the first link member 31 is returned to the position before the strap 20 is pulled and operated. At this time, the pulled state of the reclining release wire 40 connected to the first link member 31 is released, and the reclining mechanism 27 is locked again.

That is, since the seat back 12 is folded and the reclining mechanism 27 is locked, even if the strap 20 is continuously pulled and the stowing operation of the seat S is continued as it is, the folded seat back 12 will not open again.

In this embodiment, as shown in FIG. 15, to the seat-back frame 22 to which the reclining mechanism 27 is attached, the return strap 80 that unlocks the reclining mechanism 27 and makes the seat back 12 raise is attached through a return link member 81. The return link member 80 is rotatably attached to the side frame 22a and has the return strap 80 locked to one end portion side and a reclining release wire 82 that unlocks the reclining mechanism 27 by the pulling operation is locked to the other end portion side. The reclining release wire 82 is one of the bifurcated reclining release wires 40 locked to the reclining mechanism 27 side.

As will be described below, in the returning operation of the seat S, in the state in which the seat cushion 11 is installed, the seat back 12 can be made to raise by pulling the return strap 80.

In this embodiment, the reclining release wire 82 is constituted as one of the bifurcated reclining release wires 40 but it may be attached to the reclining mechanism 27 separately from the reclining release wire 40.

Subsequently, the operation of the link mechanism 130 during the stowing operation of the seat S will be described according to FIGS. 16A-D. Since the stowing operation of the seat S is the same as that in the above-mentioned first embodiment, FIG. 8 will be referred to as necessary in the following explanation.

Figure 16A:
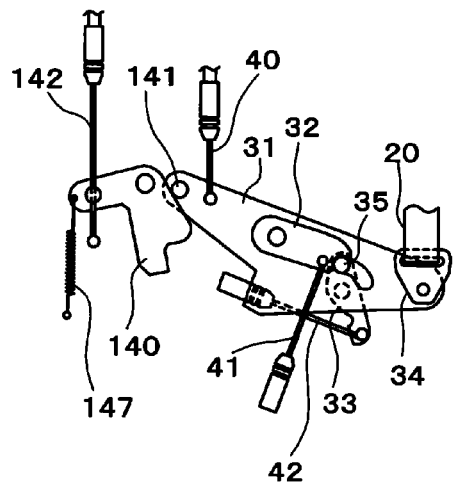
FIGS. 16A-D are operation explanatory side view diagrams of the link mechanism in a stowing operation of the stowable vehicle seat according to the second embodiment of the present invention.

FIG. 16A shows a state of the link mechanism 130 in the seat S installed state, which is a stage before the strap 20 is operated by a passenger. This state of the link mechanism 130 is the initial state.

Figure 16B:
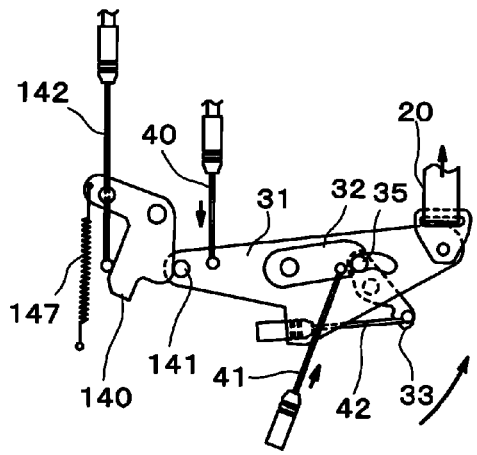

FIG. 16B shows a state of the link mechanism 130 when the reclining mechanism 27 is unlocked (FIG. 8A), which is a stage in which the strap 20 is somewhat pulled rearward. The first link member 31 is rotated in the pulled direction by the operation of the strap 20, the reclining release wire 40 is pulled, and the reclining mechanism 27 is unlocked. At this time, the second link member 32 is rotated with the first link member 31 and pulls the leg-portion release wire 41, but the lock of the locking claws 43 and 43 connecting the front-side leg portion 14 and the vehicle body floor 4 side is set so that it is not unlocked by the pulled amount in this state, and the lock of the leg portion is maintained.

Figure 16C:
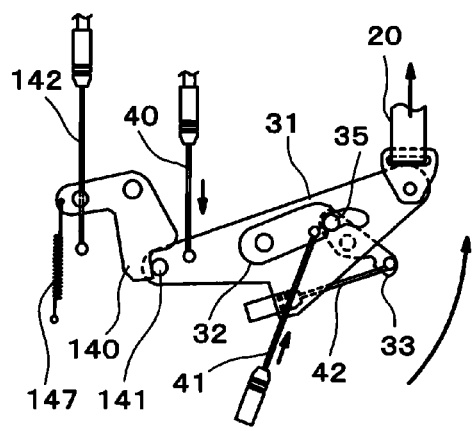

FIG. 16C shows a state (FIG. 8B) of the link mechanism 130 when the reclining mechanism 27 and the locking claws 43 and 43 of the front-side leg portion 14 are unlocked, and the strap 20 is further pulled. By pulling the strap 20 more strongly than the state of the link mechanism 130 in FIG. 16B, the second link member 32 is also rotated largely, and along with this rotation, the reclining release wire 40 and the leg-portion release wire 41 are further pulled. At this time, the leg portion is unlocked.

If, in the state of the link mechanism 130 shown in FIG. 16C, the pulling speed or the pulling load of the strap 20 which is rotating and operating the seat S rearward is changed or the pulling operation is stopped, the locking projection 141 of the first link member 31 is locked to the second locking portion 140d of the fourth link member 140. Therefore, the rotation of the first link member 31 in the direction to return to the initial position is prohibited, and the link mechanism 130 is maintained to the predetermined rotation (moved) position, and the unlocked state of the reclining mechanism 27 is maintained.

As a result, the seat back 12 is folded by the coil spring, not shown, disposed on the reclining mechanism 27.

Figure 16D:
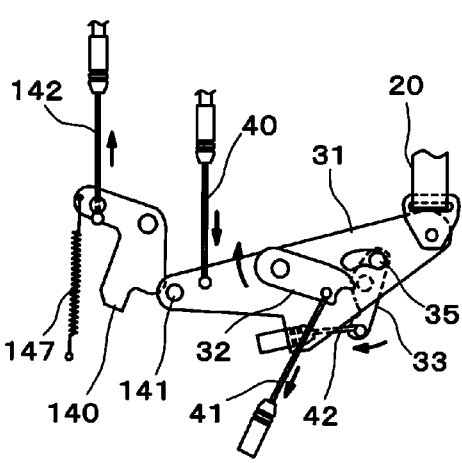

FIG. 16D shows a state of the link mechanism 130 in the final stage (FIG. 8D) of the stowing and rotation. Since the seat back 12 is folded, the third link member 33 and the fourth link member 140 are rotated, and the first link member 31 and the second link member 32 are both unlocked.

In this state, since the second link member 32 is rotated with respect to the first link member 31, the leg-portion release wire 41 is not pulled, and the reclining mechanism 27 and the leg-portion locking mechanism are locked. However, since it is already located far from the striker 44, the stowing operation of the seat S is not affected even if the leg-portion locking mechanism is locked.

Also, if the operation of the strap 20 is stopped after the seat S is stowed, the first link member 31 is returned to the position before the rotation, but since the seat back 12 is stowed in the state it is folded with respect to the seat cushion 11 (FIG. 8E), the third link member 33 and the fourth link member 140 are both maintained in the rotated state.

The returning operation of the seat S is as follows.

By pulling up a grip, not shown, of the stowed seat S, the seat S is rotated in the returning rotating direction, and the locking claws 43 and 43 of the front-side leg portion 14 of the seat S are locked to the leg-portion strikers 44 on the vehicle body floor 4 side. After that, by pulling the return strap 80 attached to the rear surface of the seat back 12 rearward, the seat back 12 is made to raise. After the seat cushion 11 is installed as mentioned above, the seat S can be returned only by the operation of pulling the return strap 80.

The operation of the link mechanism 130 during the returning operation of the seat S will be described according to FIGS. 17A-B.

Figure 17A:
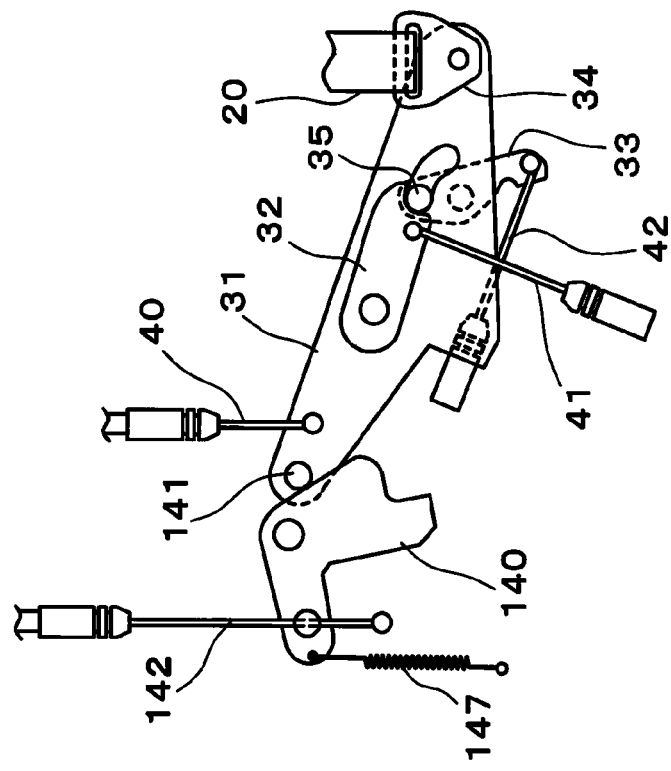
FIGS. 17A-B are operation explanatory side view diagrams of the link mechanism in a returning operation of the stowable vehicle seat according to the second embodiment of the present invention.

FIG. 17A shows a state of the link mechanism 130 from the stowed state of the seat S to a stage in which the seat S is rotated and the locking claws 43 and 43 are locked to the vehicle body floor 4 side. This is the stage before the return strap 80 is operated by a passenger, and since the seat back 12 is in the folded state, the cancel wires 42 and 142 are pulled and the third link member 33 and the fourth link member 140 are both maintained in the rotated state.

Figure 17B:
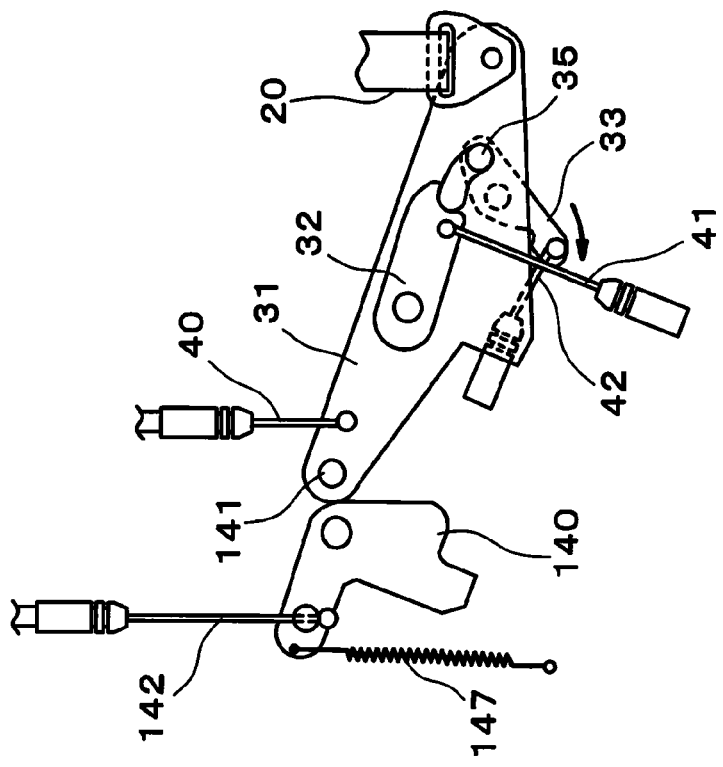

FIG. 17B shows a stage in which the return strap 80 is somewhat pulled rearward in order to make the seat back 12 raise. The seat back 12 raises by the operation of the return strap 80. The raising operation of the seat back 12 by the return strap 80 can be performed regardless of the state of the link mechanism 130. By raising of the seat back 12, the third link member 33 is returned to a lockable position of the second link member 32, and the fourth link member 140 is returned to the state in which the inclination portion 140c is brought into contact with the locking projection 141 again.

Depending on the operation of the return strap 80, the leg-portion release wire 41 is not pulled, and the lock state of the locking claws 43 and 43 is maintained.

At this time, the strap 20 is not pulled and operated, and the second link member 32 is at the initial position. Thus, the second link member 32 is locked to the first link member 31 by the third link member 33, and each of the link members of the link mechanism 130 is returned to the state of the initial position (See FIG. 16A).

Third Embodiment

Figure 18:
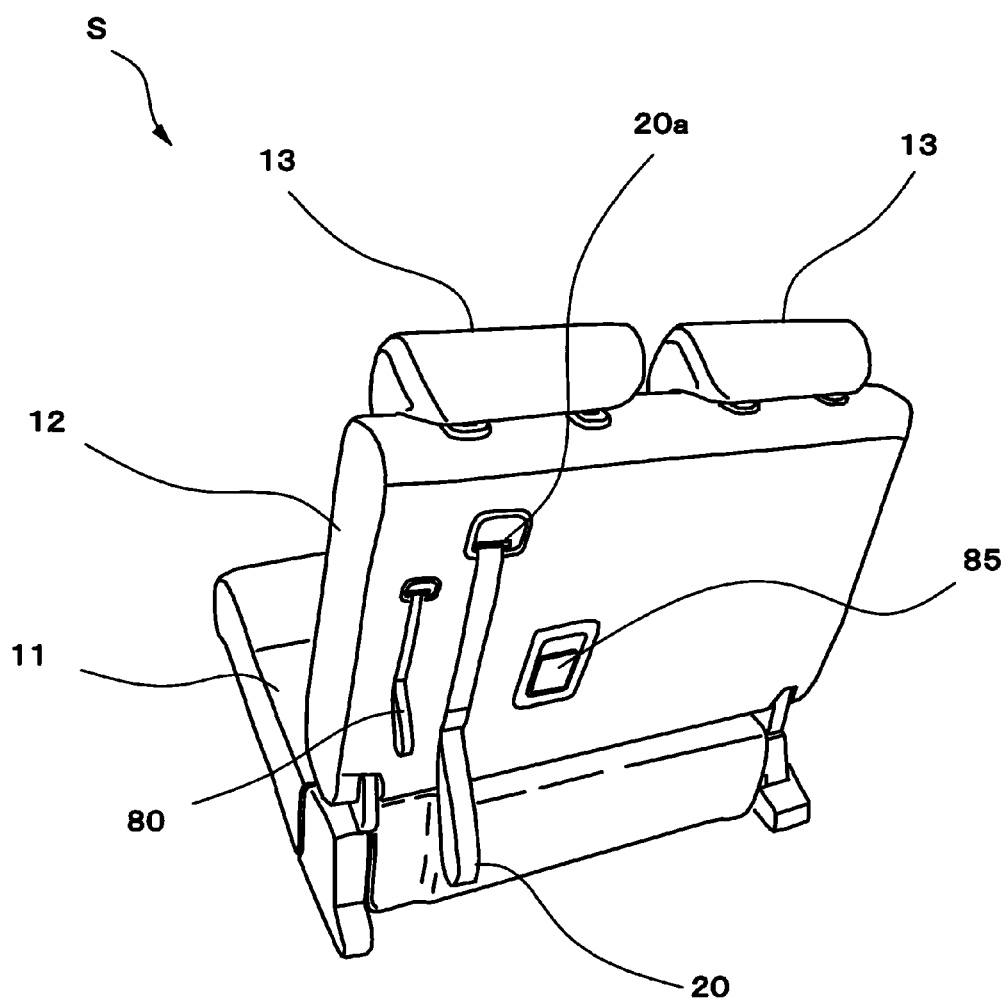
FIG. 18 is a rear perspective view of a stowable vehicle seat according to a third embodiment of the present invention.
Figure 19:
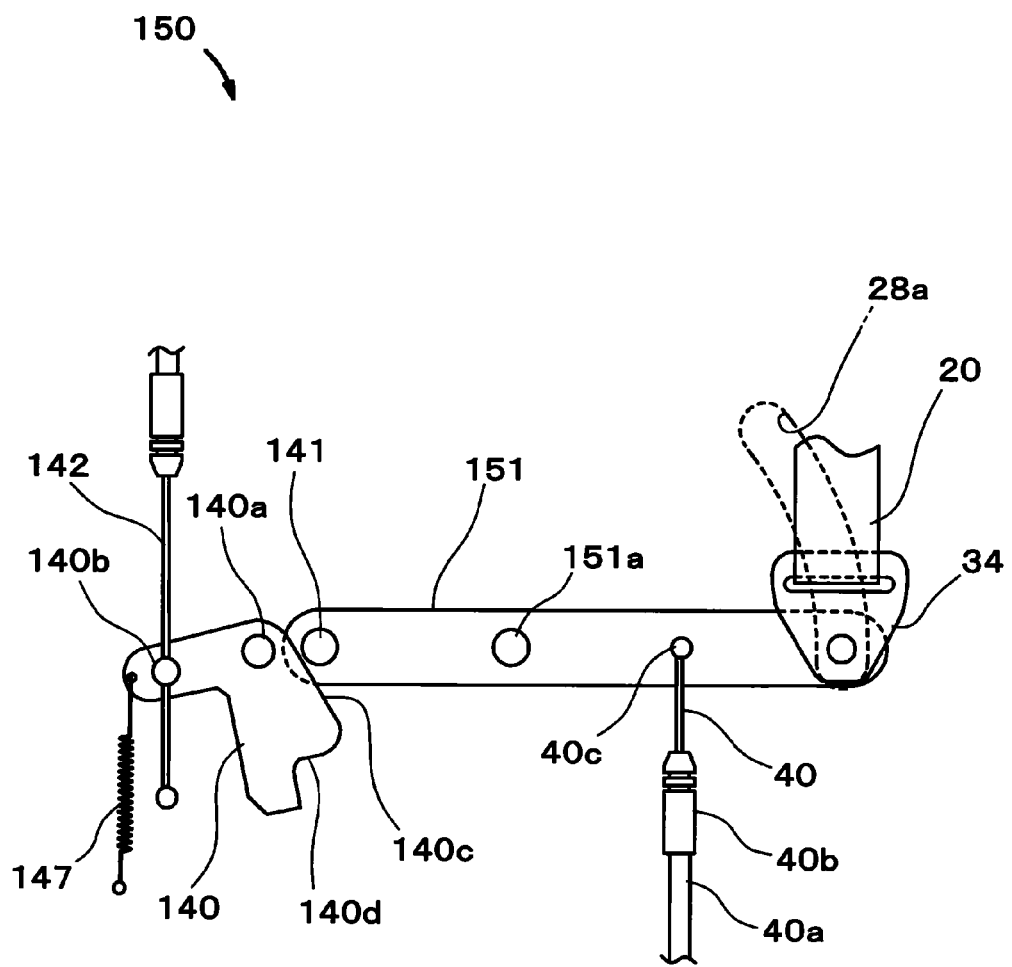
FIG. 19 is an enlarged explanatory side view diagram of a link mechanism according to the third embodiment of the present invention.

FIGS. 18 and 19 show a third embodiment of the present invention, in which FIG. 18 is a rear perspective view of a stowable vehicle seat, and FIG. 19 is an enlarged explanatory diagram of the link mechanism.

In the following embodiment, the same reference numerals are given to the same members, arrangements and the like as those in the first embodiment, and the detailed description thereof will be omitted.

As shown in FIG. 18, the seat S according to this embodiment includes the strap 20, the return strap 80, and a leg-portion release lever 85 as operating members.

By operating the leg-portion release lever 85, lock between the locking claws 43 and 43 disposed on the front-side leg portion 14 and the leg-portion strikers 44 can be unlocked.

As shown in FIG. 19, a link mechanism 150 according to this embodiment includes a first link member 151 rotatably supported on the back plate 28 and a fourth link member 140. The first link member 151 is connected to the strap 20 and the reclining release wire 40 through the strap connecting member 34, and a locking projection 141 is attached on the side opposite to the strap connecting member 34 with a shaft portion 151a between them.

When the seat S is to be stowed, first, the leg-portion release lever 85 is operated to unlock the leg portion and then, the strap 20 is pulled to unlock the reclining mechanism 27. By further pulling the strap 20, the seat S is rotated rearward and can be stowed in the stowage recess portion 5.

When the seat S is rotated rearward, even if the pulling speed or the pulling load of the strap 20 is lowered, since the locking projection 141 disposed on the first link member 151 is locked to the second locking portion 140d of the fourth link member 140, the rotation of the first link member 151 to the direction to return to the initial position is prohibited. Therefore, the link mechanism 150 is maintained at the predetermined rotation (moved) position, the reclining mechanism 27 is not locked during the stowing and rotation, and the seat back 12 can be folded.

Also, since the reclining mechanism 27 is locked in a state in which the seat back 12 is folded onto the seat cushion 11, there is no risk that the seat back 12 will open again during the stowing and rotation, and the seat S can be reliably stowed.

In each of the above embodiments, the locking rib 49 to be locked to the other end portion side of the cancel wire 42 is formed on the reclining mechanism 27, but other locking portions may be used as long as it is configured such that the cancel wire 42 is operated in the state in which the seat back 12 is folded onto the seat cushion 11. Moreover, it may be formed at a portion far from the reclining mechanism 27.

Figure 20:
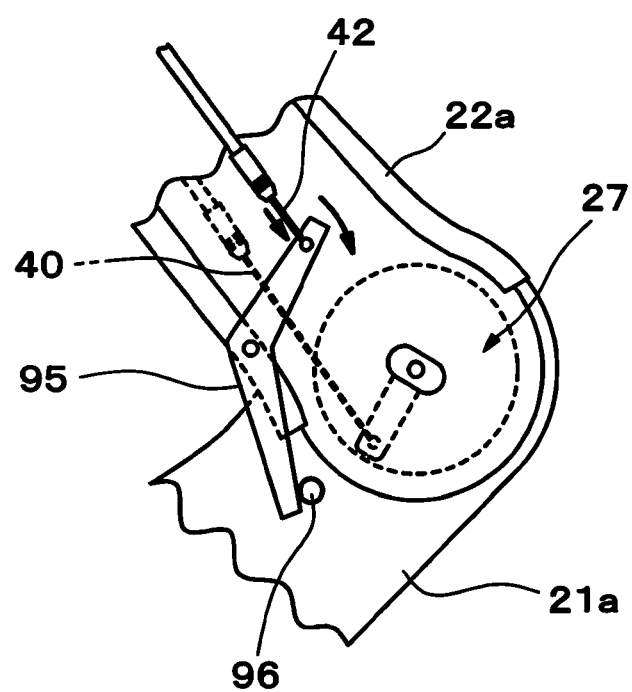
FIG. 20 is an outline explanatory side view diagram of another configuration example of a detection mechanism.

FIG. 20 is an outline explanatory diagram of another configuration example of the detection mechanism.

For example, as shown in FIG. 20, the detection mechanism can be formed by a detecting member 95 rotatably supported by the side frame 22 on the seat back 12 side and a projecting member 96 disposed on the seat cushion 11 side. The detecting member 95 is disposed having one end portion side contactable with the projecting member 96 in the folded state of the seat back 12, and the cancel wire 42 is locked to the other end portion side. When the seat back 12 is folded, the one end portion side of the detecting member 95 is brought into contact with the projecting member 96 and rotated, and the cancel wire 42 locked to the other end portion side is pullable to the reclining mechanism 27 side.

By configuring as above, the same functions as those of the detection mechanism shown in FIGS. 6 and 15 can be exerted.

As mentioned above, according to the seat S described above, the stowing and rotating operation and the locking and unlocking operation of the reclining mechanism 27 are performable only by the pulling operation of the strap 20 in the stowing operation, and favorable operability is obtainable during the stowing operation of the seat S.

Moreover, even if the pulling speed or the pulling load of the strap 20 is changed or the pulling operation is stopped during the stowing operation, return of the link mechanisms 30, 130, and 150 to the initial positions can be prohibited, and also, the unlock state of the reclining mechanism 27 is maintained and thus, the seat back 12 can be reliably folded. Also, since the reclining mechanism 27 is locked in the state in which the seat back 12 is folded onto the seat cushion 11, there is no risk that the seat back 12 will open during the stowing and rotation again, and operability is improved.

Also, in the returning operation, by pulling the strap 20 or the return strap 80 after gripping the grip disposed on the rear surface side of the seat cushion 11 to rotate the same, the seat S can be reliably returned, and the operating method is easy to be understood.

In each of the above embodiments, the third-row seat divided into right and left of an automobile was described as a specific example, but not limited to that, it is natural that the similar configuration can also be applied to a long integrally-formed bench-type seat, a passenger's seat or the other rear seats.

TABLE OF REFERENCE CHARACTERS

S seat
F seat frame
S1 right-side seat
S2 left-side side
4 vehicle body floor
5 stowage recess portion
11 seat cushion
12 seat back
13 headrest
14 front-side leg portion
20 strap
20a strap outlet portion
21 seat-cushion frame
21a back-frame support portion
22 seat-back frame
22a side frame
22b center frame
23 pillar support portion
24 front-side leg portion frame
25 seat support portion
27 reclining mechanism
28 back plate
28a guiding hole portion
30, 130, 150 link mechanism
31, 151 first link member
31a, 33a, 70a, 140a, 151a shaft portion
31b long hole
32 second link member
32b locking recess portion
32c contact portion
33 third link member
34 strap connecting member
32d, 34a, 40c, 41c, 42c, 140b locking portion
35 first locking portion
40, 82 reclining release wire
40a reclining release cable
40b, 41b, 42b, 142b end-portion member
41 leg-portion release wire
41a leg-portion release cable
42, 142 cancel wire
42a, 142a cancel cable
43 locking claw
43a rotating shaft
44 leg-portion striker
45, 47, 147 urging spring
48 coil spring
49 locking rib
70, 140 fourth link member
71, 140d second locking portion
71a plane portion
80 return strap
81 return link member
85 leg-portion release lever
95 detecting member
96 projecting member
140c inclined portion
141 locking projection
142c anchor

The invention claimed is:

1. A stowable vehicle seat comprising:
a seat support that supports one end portion side of a seat cushion movably in a front-and-rear direction;
a seat back that is foldable onto said seat cushion;
a reclining mechanism that folds said seat back onto said seat cushion;
a link mechanism that is connected to said reclining mechanism and is movable; and
an operating element connected to said reclining mechanism through said link mechanism, wherein
said link mechanism has a prohibiting member that is moved by said operating element and then, prohibits said link mechanism from returning from a moved position to an initial position;
wherein:
said link mechanism has a first link member connected to said operating element and said reclining mechanism;
said prohibiting member has a locking portion that is engageable with and disengageable from said first link member;
if said first link member has been moved by said operating element to a predetermined position, the first link member is engaged with said locking portion of said prohibiting member so that movement of said link mechanism to return to the initial position is prohibited.

2. The stowable vehicle seat according to claim 1, further comprising a detection mechanism that is connected to said link mechanism and is moved by said seat back being folded, wherein
said link mechanism has at least one detection link member that is moved by movement of said detection mechanism caused when said seat back is folded; and
when said detection link member is moved by said detection mechanism, and lock between the locking portion of said prohibiting member and said first link member is unlocked.

3. The stowable vehicle seat according to claim 2, wherein
said link mechanism includes a second link member rotatably supported to said first link member and a third link member having a locking portion that locks said second link member and locks and unlocks said second link member to said first link member; and
said detection link member is constituted by the same member as said third link member.

4. The stowable vehicle seat according to claim 3, wherein said second link member is supported by said first link member coaxially and said third link member is supported by said first link member.

5. The stowable vehicle seat according to claim 2, wherein said detection link member is constituted by the same member as said prohibiting member.

6. The stowable vehicle seat according to claim 1, wherein said prohibiting member is urged in a direction to be brought into contact with said first link member all the time.

7. The stowable vehicle seat according to claim 1, wherein
said link mechanism has a second link member rotatably supported to said first link member; and
said second link member is provided with a contact portion that can be brought into contact with the locking portion of said prohibiting member.

8. A stowable vehicle seat comprising:
a first seat support that supports one end portion side of a seat cushion movably in a front-and-rear direction;
a seat back that is foldable onto said seat cushion;
a reclining mechanism that folds said seat back onto said seat cushion;
a second seat support disposed on the other end portion side of said seat cushion;
locking and unlocking elements that lock and unlock said second seat support and a vehicle body floor side;
a link mechanism that is connected to said reclining mechanism and said locking and unlocking elements and is movable; and
operating element connected to said reclining mechanism and said locking and unlocking elements through said link mechanism, wherein
said link mechanism has a prohibiting member that is moved by said operating element and then, prohibits said link mechanism from returning from a moved position to an initial position;
wherein
said link mechanism has a first link member connected to said operating element and said reclining mechanism;
said prohibiting member has a locking portion that is engageable with and disengageable from said first link member;
if said first link member has been moved by said operating element to a predetermined position, the first link member is engaged with said locking portion of said prohibiting member so that movement of said link mechanism to return to the initial position is prohibited.

9. The stowable vehicle seat according to claim 8, further comprising a detection mechanism that is connected to said link mechanism and is moved by said seat back being folded, wherein
said link mechanism has at least one detection link member that is moved by movement of said detection mechanism caused when said seat back is folded; and
when said detection link member is moved by said detection mechanism, a lock between the locking portion of said prohibiting member and said first link member is unlocked.

10. The stowable vehicle seat according to claim 9, wherein
said link mechanism includes a second link member connected to said locking and unlocking elements and a third link member having a locking portion that locks said second link member and locks and unlocks said second link member to said first link member; and
said detection link member is constituted by the same member as said third link member.

11. The stowable vehicle seat according to claim 10, wherein said second link member is supported by said first link member coaxially and said third link member is supported by said first link member.

12. The stowable vehicle seat according to claim 9, wherein said detection link member is constituted by the same member as said prohibiting member.

13. The stowable vehicle seat according to claim 8, wherein said prohibiting member is urged in a direction to be brought into contact with said first link member all the time.

14. The stowable vehicle seat according to claim 8, wherein
said link mechanism has a second link member connected to said locking and unlocking elements; and
said second link member is provided with a contact portion that can be brought into contact with the locking portion of said prohibiting member.

* * * * *